United States Patent [19]
Mitsumoto et al.

[11] Patent Number: 6,018,309
[45] Date of Patent: Jan. 25, 2000

[54] RADAR DATA PROCESSING METHOD AND RADAR APPARATUS USING THE SAME

[75] Inventors: Masashi Mitsumoto; Takahiko Fujisaka, both of Tokyo, Japan

[73] Assignee: Mitsubishi Denki Kabushiki Kaisha, Tokyo, Japan

[21] Appl. No.: 09/251,933

[22] Filed: Feb. 18, 1999

[30] Foreign Application Priority Data

Feb. 20, 1998 [JP] Japan .................................. 10-038462

[51] Int. Cl.⁷ .......................... G01S 13/42; G01S 13/93
[52] U.S. Cl. .......................... 342/109; 342/99; 342/111; 342/115; 342/200
[58] Field of Search .................... 342/70, 71, 72, 342/87, 99, 102, 109, 115, 127, 128, 129, 130, 131, 132, 134, 135, 195, 200, 201, 202, 196, 111

[56] References Cited

U.S. PATENT DOCUMENTS

| | | | |
|---|---|---|---|
| 4,146,890 | 3/1979 | Klensch | 342/105 |
| 4,503,433 | 3/1985 | Tomasi | 342/87 |
| 5,181,037 | 1/1993 | Komatsu | 342/70 |
| 5,227,784 | 7/1993 | Masamori et al. | 340/903 |
| 5,229,774 | 7/1993 | Komatsu | 342/70 |
| 5,563,602 | 10/1996 | Stove | 342/70 |
| 5,619,208 | 4/1997 | Tamatsu et al. | 342/70 |
| 5,717,399 | 2/1998 | Urabe et al. | 342/70 |
| 5,731,778 | 3/1998 | Nakatani et al. | 342/70 |
| 5,751,240 | 5/1998 | Fujita et al. | 342/70 |
| 5,757,307 | 5/1998 | Nakatani et al. | 342/70 |
| 5,805,104 | 9/1998 | Kunert | 342/109 |
| 5,864,314 | 1/1999 | Ashihar | 342/128 |
| 5,905,458 | 5/1999 | Ashihar | 342/70 |

FOREIGN PATENT DOCUMENTS

| | | | |
|---|---|---|---|
| 2-212792 | 8/1990 | Japan . | |
| 05150035A | 6/1993 | Japan | G01S 13/34 |
| 05215842A | 8/1993 | Japan | G01S 13/34 |
| 05249233A | 9/1993 | Japan | G01S 13/42 |
| 7-77575 | 3/1995 | Japan . | |

Primary Examiner—John B. Sotomayor

[57] ABSTRACT

A radar data processing method of switching a continuous wave consisting of up phase and down phase into a transmission signal and a local signal in an interrupted manner and using a beat signal between the local signal and a reception signal. The method comprises the steps of setting a range of beat frequencies in up phase used for making a search for a combination and a range of beat frequencies in down phase used for making a search for a combination from beat frequencies corresponding to a distance range to be measured and a predetermined measurement speed range, and making a search for a combination for the same target for the beat frequencies in the up phase and the beat frequencies in the down phase only in the range.

9 Claims, 21 Drawing Sheets

RADAR DATA PROCESSING METHOD AND RADAR APPARATUS USING THE SAME

BACKGROUND OF THE INVENTION

1. Field of the Invention

This invention relates to a radar apparatus on board of a vehicle, etc., and in particular to a radar data processing method capable of measuring the relative distance and relative speed of a target and a radar apparatus using the method.

2. Description of the Related Art

A radar apparatus on board of a vehicle, etc., has a target distance range of about several m to 200 m and it is advisable to provide the radar apparatus with one antenna used for both transmission and reception, so that the radar apparatus is miniaturized; it is preferable from the viewpoint of installation of the radar apparatus in a vehicle, etc. As a radar data processing method satisfying such demands, an FMICW (frequency modulated interrupted continuous wave) method can be named.

FIG. 15 is a diagram to show the basic configuration of a radar apparatus in a related art using the FMICW method.

In the figure, a radar apparatus 1 comprises a control section 2 for generating various control signals, a modulated waveform generation section 33 for generating modulated waveforms of up phase (modulation frequency rise period) and down phase (modulation frequency fall period) based on the control signals from the control section 2, a voltage-controlled oscillator (VCO) 4 for generating a VCO signal of up phase and a VCO signal of down phase in response to output signals from the modulated waveform generation section 33, and switches 5 and 6 having moving terminals connected to the VCO 4 and an antenna 7 installed so as to track a target 8, terminals t connected to each other, and terminals r connected to distribution circuits 9b and 9a described later.

The switches 5 and 6 are controlled by the control section 2 and repeat the operation of connecting to the t terminals for preset time $\tau$ and connecting to the r terminals for preset time T-$\tau$ in synchronization with each other, as shown in FIG. 17.

One output terminal of the distribution circuit 9a is connected to one input terminal of a mixer 11a and the other output terminal of the distribution circuit 9a is connected to one input terminal of a mixer 11b. One output terminal of the distribution circuit 9b is connected to the other input terminal of the mixer 11a and the other output terminal of the distribution circuit 9b is connected to the other input terminal of the mixer 11b via a phase-shift circuit 10.

Output terminals of the mixers 11a and 11b are connected to A/D converters 12a and 12b each for converting an analog signal into a digital signal. The digital signals provided by the A/D converters 12a and 12b are stored in memories 13a and 13b.

Output terminals of the memories 13a and 13b are connected to a signal processing section 14 and an output terminal of the signal processing section 14 is connected to a display section 15.

The components 9 to 15 are also contained in the radar apparatus 1.

FIG. 16 shows the frequencies of the signals relative to the time in the FMICW method. Hereinafter, the modulation phase in which the frequency becomes higher with the passage of time will be called up phase and the modulation phase in which the frequency becomes lower with the passage of time will be called down phase.

In FIG. 16, a VCO signal 16a of up phase and a VCO signal 16b of down phase are signals generated from the VCO 4 and a transmission signal 17a of up phase and a transmission signal 17b of down phase are signals emitted from the VCO 4 through the antenna 7 into the air for the time $\tau$ for which the switches 5 and 6 connect to the t terminals.

A local signal 18a of up phase and a local signal 18b of down phase are signals input from the VCO 4 to the distribution circuit 9b for the time T-$\tau$ for which the switches 5 and 6 connect to the r terminals. A reception signal 19a of up phase and a reception signal 19b of down phase are signals received at the antenna 7 with a delay of a predetermined time after the transmission signals for the time T-$\tau$ for which the switches 5 and 6 connect to the r terminals, and input to the distribution circuit 9a. A beat signal 20a of up phase and a beat signal 20b of down phase are signals provided by mixing the local signals 18a and 18b and the reception signals 19a and 19b by the mixers 11a and 11b.

FIG. 17 shows the terminal connection timings in the switches 5 and 6 relative to the time. Assuming that the total time for which the switches 5 and 6 connect to the t and r terminals is T=(n+1)$\tau$, the switches 5 and 6 are controlled by the control section 2 and repeat the operation of connecting to the t terminals for the preset time $\tau$ and connecting to the r terminals for the preset time T-$\tau$ in synchronization with each other, as described above.

FIG. 18 shows sample data of up phase and down phase in the memories 13a and 13b in FIG. 15. When the transmission signal 17a and 17b in FIG. 16 are sampled at timings R1-Rn, data pieces P1-Pn are read accordingly and an up-phase data matrix 21a and a down-phase data matrix 21b each consisting of rows P1-Pn and columns R1-Rn in the lower portion of FIG. 18 are provided on the memories 13a and 13b.

FIG. 19 is a block diagram to show the basic configuration of the signal processing section 14 in FIG. 15.

In FIG. 19, the signal processing section 14 comprises a signal processing control section 22 for performing signal processing as shown in FIG. 20 described later, frequency analysis sections 23a and 23b for analyzing frequency spectra from up-phase data and down-phase data from the memories 13a and 13b at the preceding stage under the control of the signal processing control section 22, signal detection sections 24a and 24b for detecting frequencies of spectra detected as target by the frequency analysis sections 23a and 23b under the control of the signal processing control section 22, a combination search section 25 for making a search for a desired combination from the frequencies of the spectra detected by the signal detection sections 24a and 24b under the control of the signal processing control section 22, and a speed measurement section 26 for measuring target relative speed of the combination search section 25 under the control of the signal processing control section 22.

Next, the general operation of the radar apparatus in FIG. 15 will be discussed.

The FMICW method uses a frequency-modulated continuous wave in an interrupted manner.

Under the control of the control section 2 in the radar apparatus 1, a modulated waveform consisting of up phase and down phase generated by the modulated waveform generation section 33 is input to the VCO 4 and becomes the VCO signal 16 shown in FIG. 16, then the VCO signal 16 is input to the switch 5. The switches 5 and 6 are controlled by the control section 2 and repeat the operation of connecting to the t terminals for the preset time τ and connecting to the r terminals for the preset time T-τ in synchronization with each other, as shown in FIG. 17.

First, in the up phase, the VCO signal 16 from the VCO 4 with the switches 5 and 6 connecting to the t terminals for the time τ becomes the transmission signal 17 in FIG. 16 and the transmission signal 17 is input via the switches 5 and 6 to the antenna 7 from which it is emitted in the air. The transmission signal 17 emitted in the air is applied to a target 8 being at one relative distance R and moving at one relative speed V and a part of the transmission signal 17 is reflected.

The reflected wave is shifted by Doppler frequency Fv responsive to the relative speed V and is received at the antenna 7 at the time with a delay of Kτ=2R/c (c is radio wave speed) after the transmission signal 17, then becomes the reception signal 19 in FIG. 16 and the reception signal 19 is input to the distribution circuit 9a via the switch 6 connecting to the r terminal for the time T-τ. The distribution circuit 9a divides the input signal into two parts and feeds the signal parts into the mixers 11a and 11b.

On the other hand, the VCO signal 16 via the switch 5 connecting to the r terminal for the time T-τ is input to the distribution circuit 9b as the local signal 18 in FIG. 16. The distribution circuit 9b divides the input signal into two parts and feeds the signal parts into the mixer 11a and the phase-shift circuit 10, which then shifts the phase of the input signal by π/2 radian and outputs the resultant signal to the mixer 11b.

The reception signal 19 and the local signal 18 input to the mixers 11a and 11b are mixed in the period of Kτ to (K+1)τ in the time T-τ into beat signal 20 with the frequency difference between the reception signal 19 and the local signal 18 appearing as a frequency.

At this time, the beat signal 20 provided by the mixer 11a corresponds to the real part of a complex signal and the beat signal 20 provided by the mixer 11b corresponds to the imaginary part of a complex signal, thus the beat signal 20 is provided as a complex signal.

Also in the down phase, beat signal 20 is provided as in the up phase described above.

At this time, letting the beat signal 20 in the up phase be Sup(t), Sup(t) is represented by the following expression (1) and letting the beat signal 20 in the down phase be Sdn(t), Sdn(t) is represented by the following expression (2):
[Expression1]

$$Sup(t)=A_{up}eIp(j2\pi U.t+\phi_{up})=A_{up}\sin(2\pi U.t+\phi_{up})+jA_{up}\cos(2\pi U.t+\phi_{up}) \quad (1)$$

$$Sdn(t)=A_{dn}eIp(j2\pi D.t+\phi_{dn})=A_{dn}\sin(2\pi D.t+\phi_{dn})+jA_{dn}\cos(2\pi D.t+\phi_{dn}) \quad (2)$$

where $$U = \frac{2B}{cT}R - \frac{2}{\lambda}V \quad (3)$$

$$D = -\frac{2B}{cT}R - \frac{2}{\lambda}V \quad (4)$$

Aup, Adn: Amplitude term, φup, φfn: Phase term, B: Frequency modulation width, c: Light speed, T: Modulation period, R: Target relative distance, λ: Radar carrier wave length, V: Target relative speed The beat signal 20 is sampled by the A/D converter 12 every τ and is stored in the memory 13. At this time, n sampling results following data P1 representing the transmission signal 17 for each phase are stored in order as (P1, R1), (P1, R2), (P1, R3), ..., (P1, Rn), as shown in FIG. 18.

Likewise, n sampling results following data P2 representing the transmission signal 17 are also stored in the memory 13 in order as (P2, R1), (P2, R2), (P2, R3), ..., (P2, Rn), where Rk (k=1–n) contains the signal of the target at a relative distance in the range indicated by the following expression (5):
[Expression 2]

$$k\frac{c\tau}{2} < Rk \le (k+1)\frac{c\tau}{2} \quad (5)$$

At the time at which sampling for data Pm terminates, the signal processing section 14 reads data from the memory 13 and starts signal processing under the control of the control section 2.

Next, the detailed operation of the signal processing section 14 will be discussed with reference to FIG. 20 to show a signal processing procedure of the signal processing section 14 and FIG. 21 to show input/output of the frequency analysis section 23 in the signal processing section 14.

FIG. 21 shows input signals 27a–27c to the frequency analysis section and output signals 28a–28c from the frequency analysis section.

First, at step ST1, the signal processing control section 22 sets its internal counter (variable) k=1.

At step ST2, under the control of the signal processing control section 22, the frequency analysis section 23a reads data P1-Pm in column Rk from the up-phase data matrix 21a in FIG. 18 and finds a frequency spectrum as output signal 28 from input signals P1-Pm27 as shown in FIG. 21 by performing FFT (fast Fourier transform), etc., for example, for the data, then outputs the frequency spectrum to the signal detection section 24a.

At step ST3, under the control of the signal processing control section 22, the signal detection section 24a executes signal detection using CFAR (constant false alarm rate) detection, for example, for the input frequency spectrum, finds frequencies U1, U2, ..., Up of the spectrum detected as the target, and outputs the frequencies to the combination search section 25.

At step ST4, under the control of the signal processing control section 22, the frequency analysis section 23b reads data P1-Pm in column Rk from the down-phase data matrix 21b in FIG. 18 and finds a frequency spectrum by performing FFT, etc., for example, for the data, then outputs the frequency spectrum to the signal detection section 24b.

At step ST5, under the control of the signal processing control section 22, the signal detection section 24b executes signal detection using CFAR detection, for example, for the input frequency spectrum, finds frequencies D1, D2, ..., Dq of the spectrum detected as the target, and outputs the frequencies to the combination search section 25.

Next, at step ST6, under the control of the signal processing control section 22, the combination search section 25 combines the input frequencies U1, U2, ..., Up and D1, D2, ..., Dq and makes a search for combination Cij (Ui, Dj) in which relative distance R found according to expression (6) mentioned below becomes the range of Rk shown in the above-mentioned expression (5).

If the combination is found, control goes to step ST7 at which the combination search section 25 outputs the relative distance R found at the search time to the display section 15 in FIG. 15 and outputs the combination Cij (Ui, Dj) to the speed measurement section 26.

[Expression 3]

$$R = \left(\frac{cT}{2B}\right)\left(\frac{Ui - Dj}{2}\right) \quad (6)$$

Further, at step ST7, the speed measurement section 26 uses the following expression (7) to find relative speed V of the target from the input combination Cij (Ui, Dj) and outputs the relative speed V to the display section 15 in FIG. 15:

[Expression 4]

$$V = -\left(\frac{\lambda}{2}\right)\left(\frac{Ui + Dj}{2}\right) \quad (7)$$

The display section 15 displays the input relative distance R and relative speed V as information using text or an image on a CRT, for example.

At step ST8, the signal processing control section 22 adds one to the counter variable k. At step ST9, the signal processing control section 22 compares the value of the counter variable k with n. If the value of the counter variable k is less than n, the signal processing control section 22 causes the frequency analysis section 23a to again execute step ST2; if the value of the counter variable k is greater than n, the signal processing control section 22 terminates the process.

The described radar apparatus in the related art can find the relative distance and relative speed of the target with no problem if one detection result is produced at Rk (k=1–n) in each phase.

In fact, however, more than one detection result may be produced at each Rk. When the combination search section 25 makes a search for the combination Cij (Ui, Dj) for the same target at step ST6 in FIG. 20, it cannot make a search for all combinations in real time; the relative distance and relative speed of the target cannot be found in spite of detection in detection processing.

SUMMARY OF THE INVENTION

It is therefore an object of the invention to provide a radar data processing method and a radar apparatus capable of measuring relative distances and relative speeds of a number of targets in real time with limitation placed on a search made for a combination.

To the end, according to a first aspect of the invention, there is provided a radar data processing method of switching a continuous wave consisting of a modulation frequency rise period (up phase) and a modulation frequency fall period (down phase) into a transmission signal and a local signal in an interrupted manner and using a beat signal between the local signal and a reception signal, the method comprising the steps of setting a range of beat frequencies in up phase used for making a search for a combination and a range of beat frequencies in down phase used for making a search for a combination from beat frequencies corresponding to a distance range to be measured and a preset measurement speed range, and making a search for a combination for the same target for the beat frequencies in the up phase and the beat frequencies in the down phase only in the range.

According to a second aspect of the invention, there is provided a radar data processing method of switching a continuous wave consisting of up phase and non-modulation phase into a transmission signal and a local signal in an interrupted manner and using a beat signal between the local signal and a reception signal, the method comprising a first step of setting a range of beat frequencies in up phase used for making a search for a combination and a range of beat frequencies in non-modulation phase used for making a search for a combination from beat frequencies corresponding to a distance range to be measured and a preset measurement speed range, a second step of assigning priorities provided based on a predetermined criterion to the beat frequencies in the non-modulation phase in the range, and a third step of making a search for a combination for the same target for the beat frequencies in the non-modulation phase assigned the priorities and the beat frequencies in the up phase only in the range.

In the radar data processing method according to a third aspect of the invention, in the second aspect of the invention, the first step is replaced with a fourth step of setting a range of beat frequencies to be measured in non-modulation phase from a preset measurement speed range, the method further comprises a fifth step of counting the number of the beat frequencies to be measured in the non-modulation phase only in the range, and the first and second steps are replaced with a sixth step of comparing the counted number of the beat frequencies with 1, a seventh step of finding a relative distance and relative speed from one beat frequency in the up phase and one beat frequency in the down phase if the number equals 1 as a result of the comparison, and an eighth step of finding the number of targets and relative speed of each target and adopting a typical value all as relative distances of the targets if the number does not equal 1 as a result of the comparison.

The radar data processing method according to a fourth aspect of the invention, in the second aspect of the invention, further comprises a ninth step of measuring ground speed of a radar platform, wherein the second step is replaced with a tenth step of discarding the result in the vicinity of the beat frequency corresponding to a target approaching at the ground speed for the beat frequencies in the non-modulation phase in the range and then assigning priority provided based on a predetermined criterion.

According to a fifth aspect of the invention, there is provided a radar apparatus comprising signal generation means for switching a continuous wave making a plurality of modulation forms into a transmission signal and a local signal in an interrupted manner and sending, beat signal formation means for forming a beat signal between a reception signal resulting from reflecting the transmission signal output by the signal generation means on an external target and the local signal and storing the beat signal, and signal processing means for measuring relative speed and relative distance of the target based on the beat signal from the beat signal formation means and a preset speed measurement range.

In the radar apparatus according to a sixth aspect of the invention, in the fifth aspect of the invention, the signal generation means comprises modulated waveform generation section for generating modulated waveform of up phase and down phase, and the signal processing means comprises a signal processing section having means for setting a range of beat frequencies in up phase used for making a search for a combination and a range of beat frequencies in down phase used for making a search for a combination from beat frequencies corresponding to a distance range to be measured and a preset measurement speed range and means for making a search for a combination for the same target for the beat frequencies in the up phase and the beat frequencies in the down phase only in the range.

In the radar apparatus according to a seventh aspect of the invention, in the fifth asepct of the invention, the signal generation means comprises a modulated waveform generation section for generating modulated waveform of up phase and non-modulation phase, and the signal processing means comprises a signal processing section having means for setting a range of beat frequencies in up phase used for making a search for a combination and a range of beat frequencies in non-modulation phase used for making a search for a combination from beat frequencies corresponding to a distance range to be measured and a preset measurement speed range, means for assigning priorities provided based on a predetermined criterion to the beat frequencies in the non-modulation phase in the range, and means for making a search for a combination for the same target for the beat frequencies in the non-modulation phase assigned the priorities and the beat frequencies in the up phase only in the range.

In the radar apparatus according to an eighth aspect of the invention, the signal processing means comprises in place of the signal processing section in the seventh aspect of the invention, a signal processing section having means for setting a range of beat frequencies to be measured in non-modulation phase from a preset measurement speed range, means for counting the number of the beat frequencies to be measured in the non-modulation phase only in the range, and means for comparing the counted number of the beat frequencies with 1 and finding a relative distance and relative speed from one beat frequency in the up phase and one beat frequency in down phase if the number equals 1 as a result of the comparison, the means for finding the number of targets and relative speed of each target and adopting a typical value all as relative distances of the targets if the number does not equal 1 as a result of the comparison.

The radar apparatus according to a ninth aspect of the invention, in the seventh aspect of the invention, further includes a radar platform ground speed measurement section for measuring ground speed of a radar platform, wherein the signal processing means comprises in place of the signal processing section, a signal processing section having means for discarding the result in the vicinity of the beat frequency corresponding to a target approaching at the ground speed for the beat frequencies in the non-modulation phase in the range and then assigning priority provided based on a predetermined criterion.

DETAILED DESCRIPTION OF THE PREFERRED EMBODIMENTS

Now, a description will be given in more detail of preferred embodiments of the invention with reference to the accompanying drawings.

First embodiment

Figure 1:
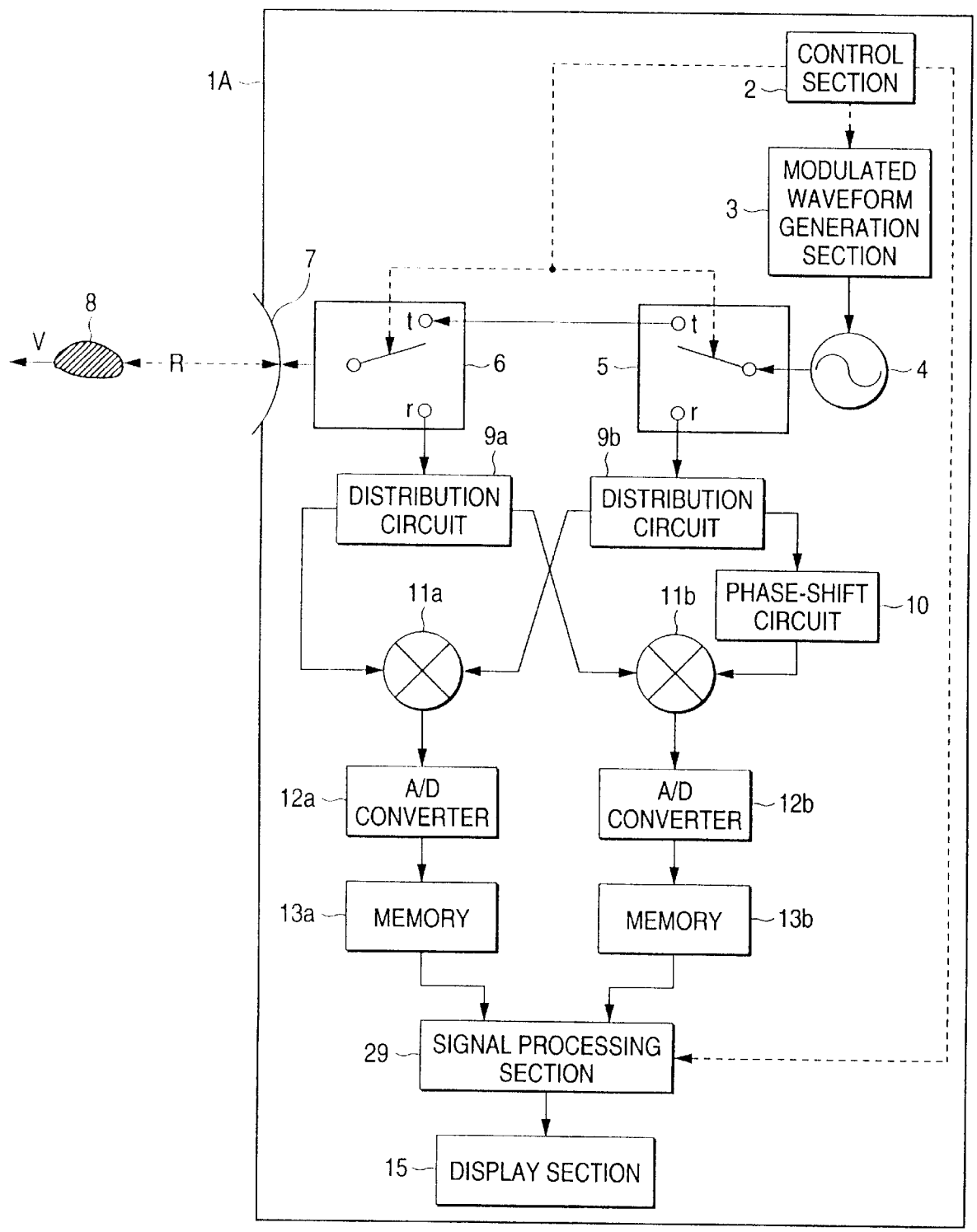
FIG. 1 is a diagram to show the configuration of a first embodiment of the invention.

FIG. 1 is a diagram to show the configuration of a first embodiment of the invention.

Figure 15:
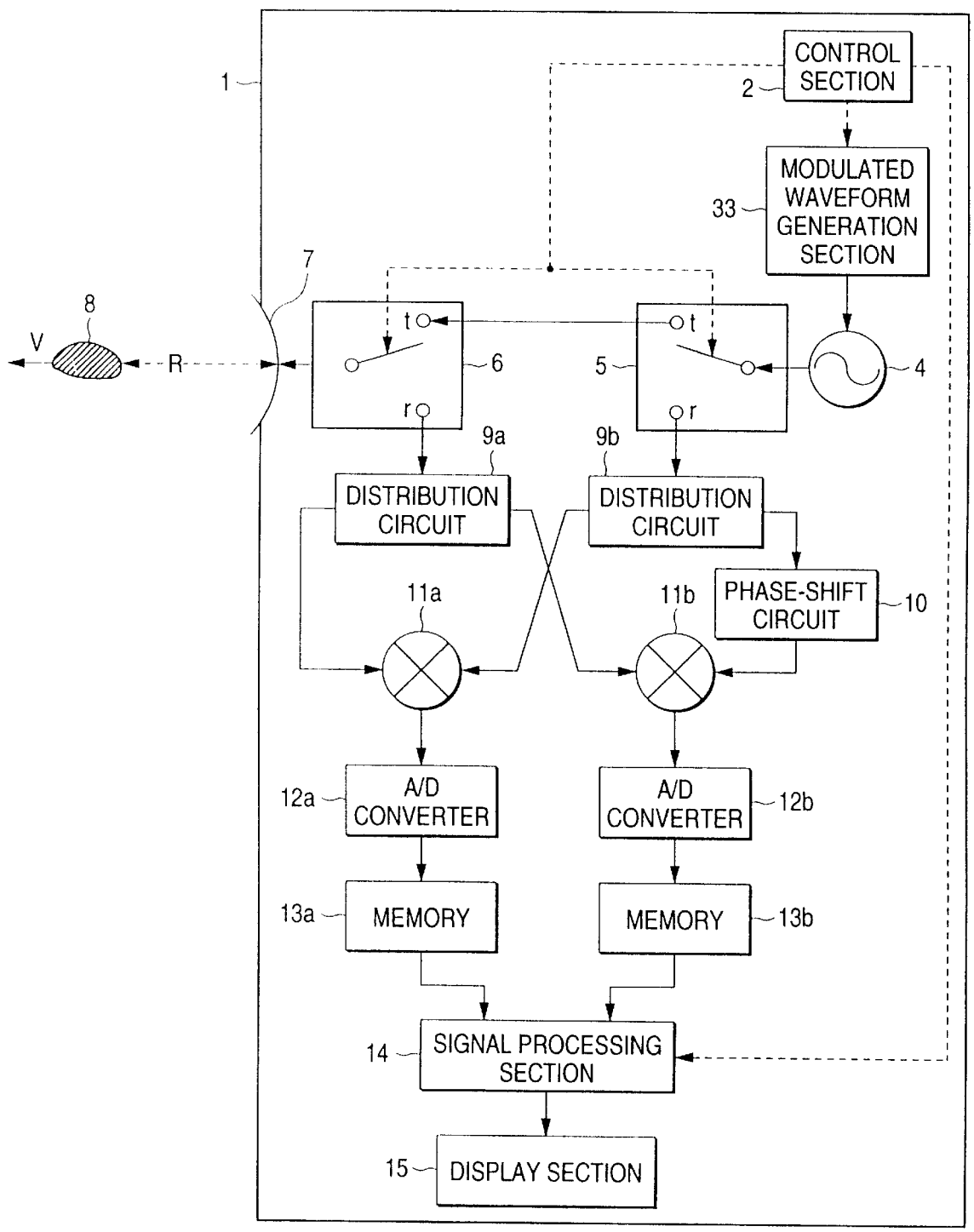
FIG. 15 is a diagram to show the configuration of a radar apparatus in a related art.

Parts identical with or similar to those previously described with reference to FIG. 15 are denoted by the same reference numerals in FIG. 1 and will not be discussed again in detail.

A radar apparatus 1A of the embodiment comprises a signal processing section 29 as signal processing means in place of the signal processing section 14 in FIG. 15. Other components are similar to those previously described with reference to FIG. 15. Components 2 to 6 make up signal generation means and components 9 to 13 make up beat signal formation means.

Figure 2:
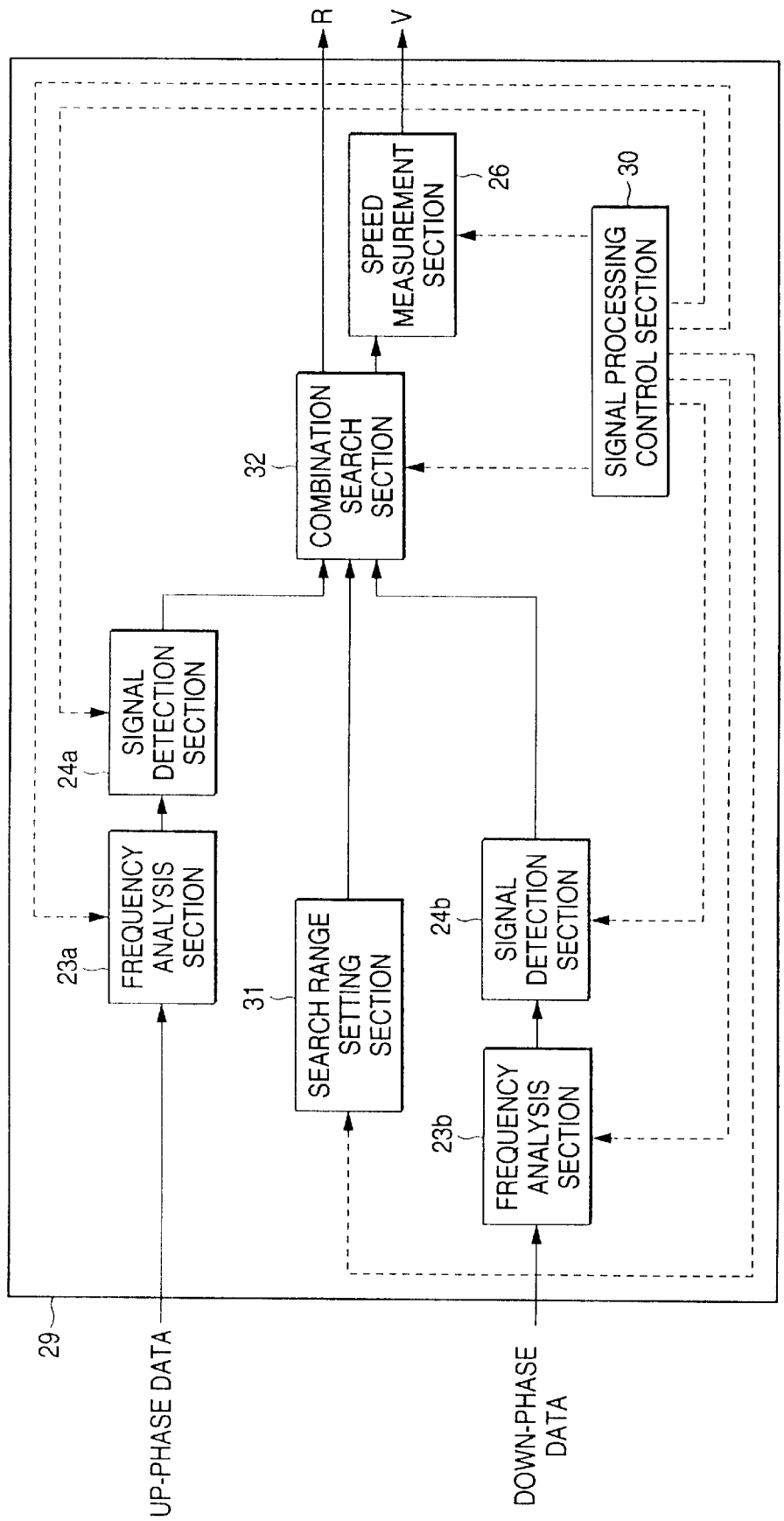
FIG. 2 is a block diagram to show a signal processing section in the first embodiment of the invention.

FIG. 2 is a block diagram to show a specific circuit configuration example of the signal processing section 29.

Figure 19:
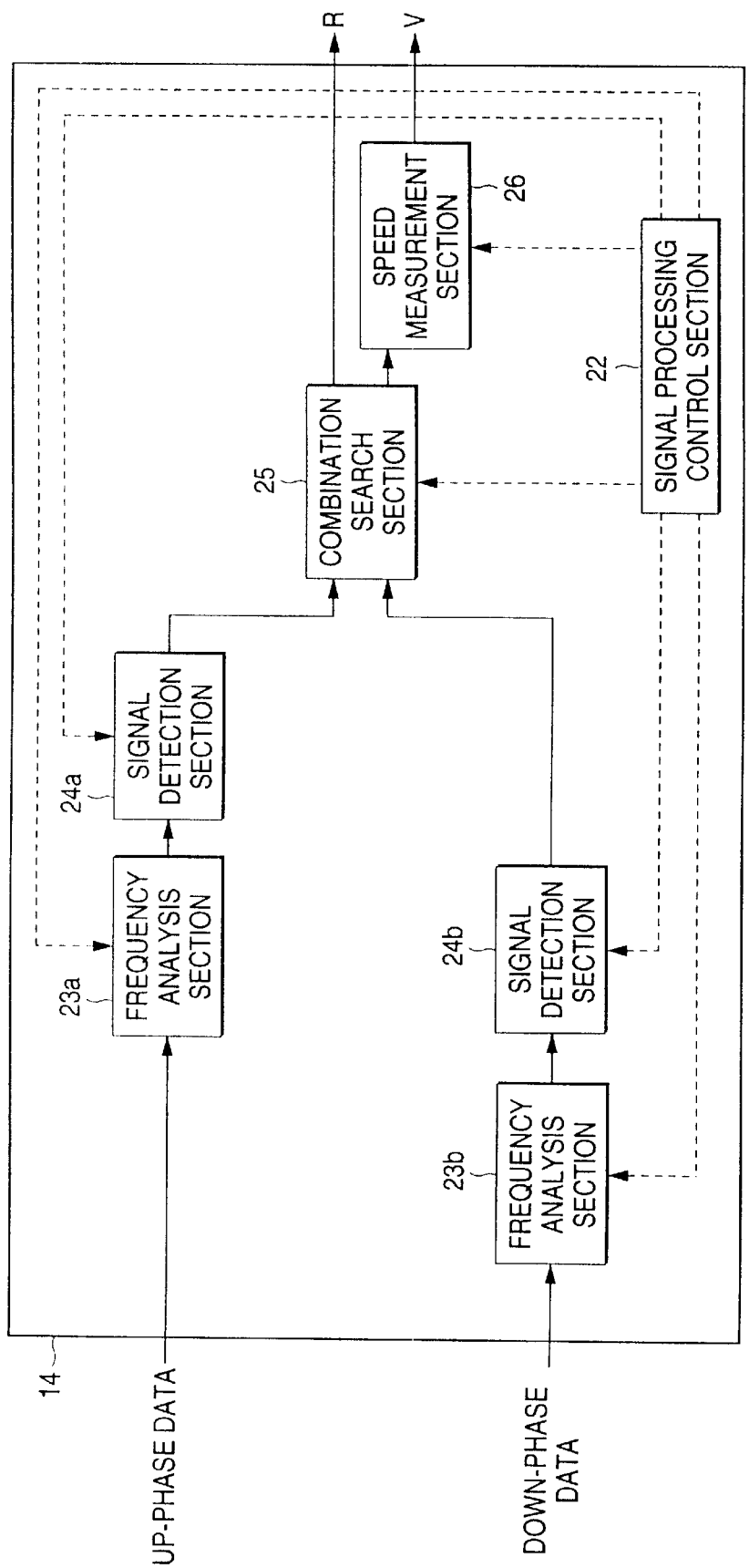
FIG. 19 is a block diagram to show a signal processing section in the radar apparatus in the related art.

Parts identical with or similar to those previously described with reference to FIG. 19 are denoted by the same reference numerals in FIG. 2 and will not be discussed again in detail.

The signal processing section 29 comprises frequency analysis sections 23a and 23b, signal detection sections 24a and 24b, a speed measurement section 26, a search range setting section 31, a combination search section 32, and a signal processing control section 30 for controlling the sections.

The search range setting section 31 sets a combination search range under the control of the signal processing control section 30. The combination search section 32 makes a search for a desired combination in the search range set by the search range setting section 31 from the frequencies of spectra detected by the signal detection sections 24a and 24b.

Other components are equivalent to those previously described with reference to FIG. 19.

Next, the general operation of the radar apparatus in FIG. 1 will be discussed.

For each of up phase and down phase, under the control of the control section 2, a radio wave from a VCO 4 via switches 5 and 6 to an antenna 7 is transmitted from the antenna 7 and is reflected on a target 8 being at relative distance R and moving at relative speed V and the reflected wave passes through the antenna 7 and the switch 6, then is input via distribution circuit 9 and a phase-shift circuit 10 to mixer 11, which then generates a beat signal. The beat signal is sampled by A/D converter 12 and the sampling result is stored in memory 13 as data.

At the time at which sampling for data Pm terminates, the signal processing section 29 reads the data from the memory 13 and starts signal processing under the control of the control section 2.

Figure 3:
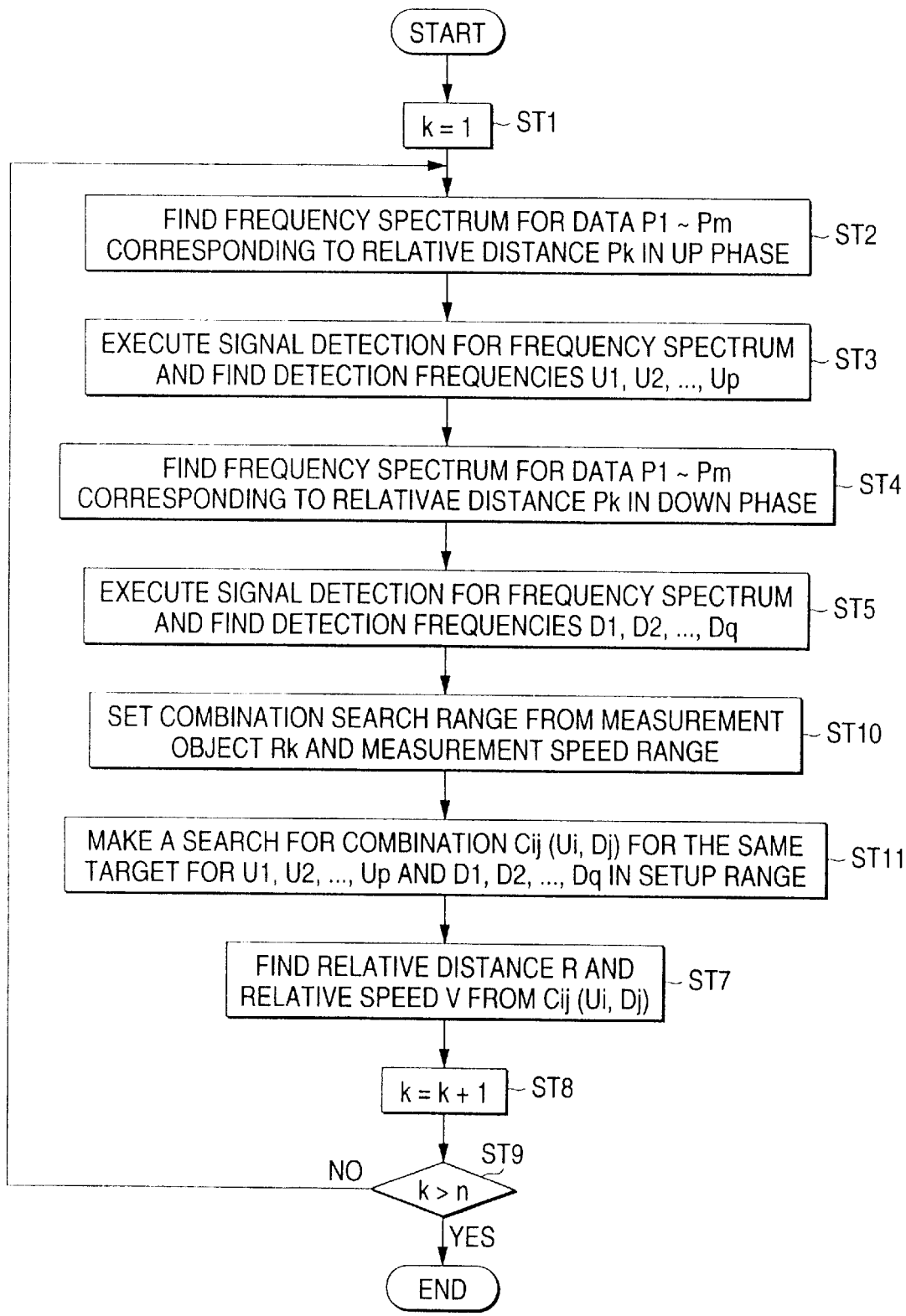
FIG. 3 is a flowchart to show a processing procedure for finding a relative distance and relative speed in the first embodiment of the invention.

Next, the detailed operation of the signal processing section 29 will be discussed with reference to FIG. 3.

Figure 20:
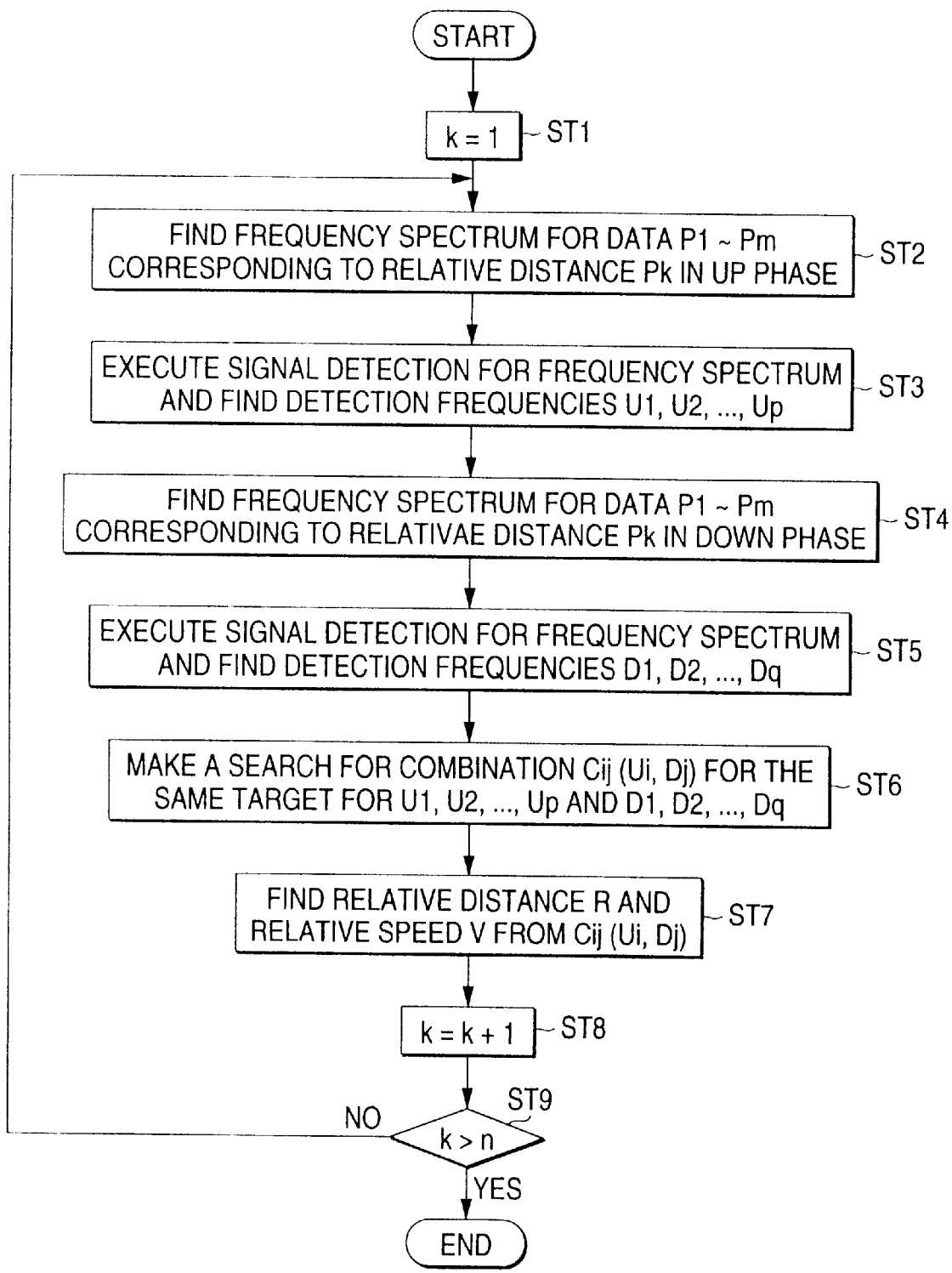
FIG. 20 is a flowchart to show a processing procedure for finding a relative distance and relative speed by the radar apparatus in the related art.
Figure 21:
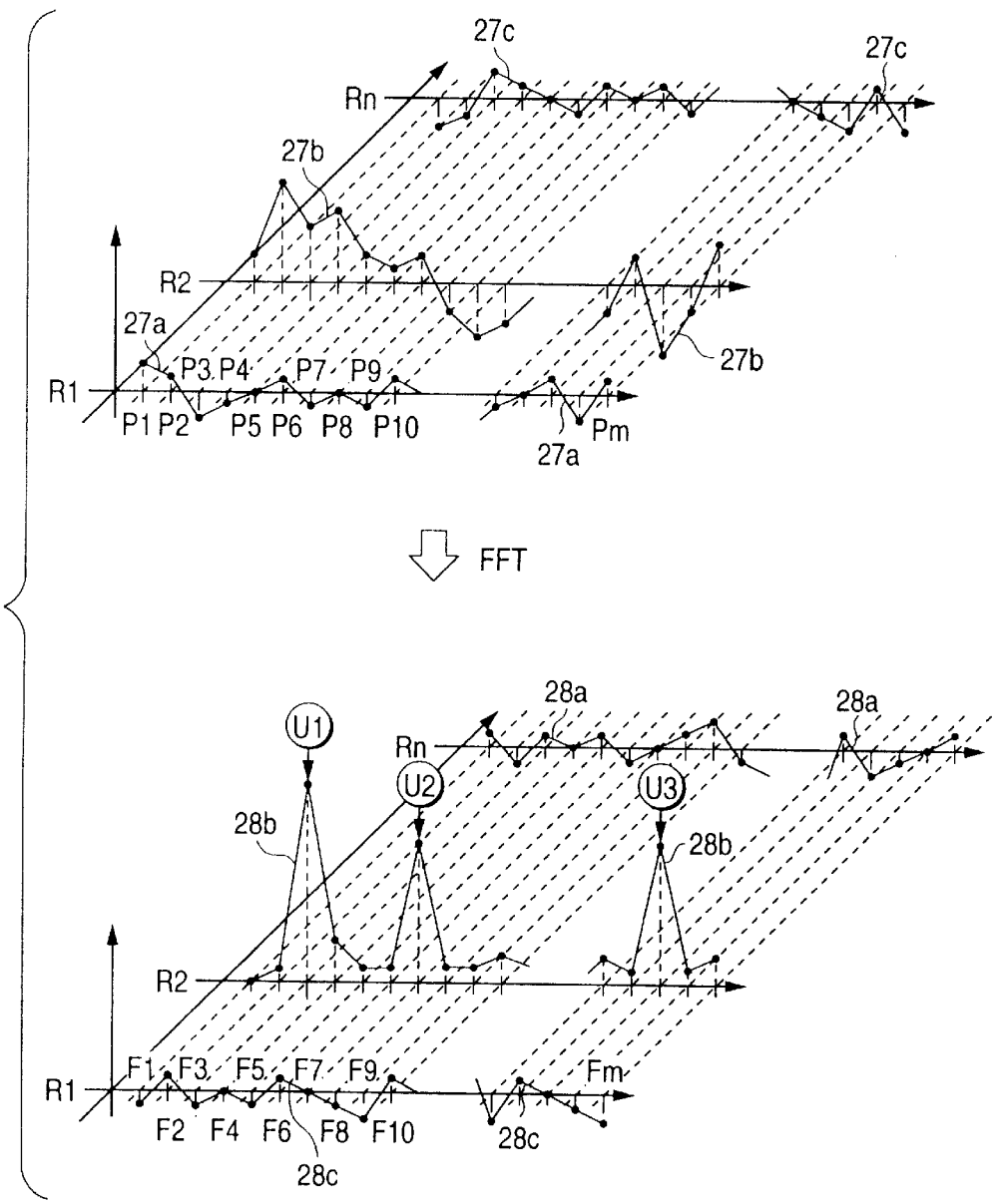
FIG. 21 is an illustration to show process signals in the radar apparatus in the related art.

First, at step ST1, the signal processing control section 30 sets its internal counter (variable) k=1. At steps ST2 to ST5, the frequency analysis sections 23a and 23b and the signal detection sections 24a and 24b operate under the control of the signal processing control section 30 as previously described with reference to FIG. 20.

At step ST10, the search range setting section 31 sets a combination search range in each phase according to expressions (8) to (11) mentioned below from the current measurement object, Rk, input from the signal processing control section 30 and preset measurement speed range −Vmns to Vp1s, and outputs the combination search range to the combination search section 32.

That is, at step ST10, the combination search range is set in each phase from the current measurement object, Rk, and the preset measurement speed range −Vmns to Vp1s.

In the up phase, the combination search range is from frequency Umns represented by expression (8) to frequency Up1s represented by expression (9); in the down phase, the combination search range is from frequency Dmns represented by expression (10) to frequency Dp1s represented by expression (11).
[Expression 5]

$$Umns = \frac{B\tau}{T}k - \frac{\lambda}{2}Vpls \qquad (8)$$

$$Upls = \frac{B\tau}{T}(k+1) + \frac{\lambda}{2}Vmns \qquad (9)$$

$$Dmns = -\frac{B\tau}{T}(k+1) - \frac{\lambda}{2}Vpls \qquad (10)$$

$$Dpls = -\frac{B\tau}{T}k + \frac{\lambda}{2}Vmns \qquad (11)$$

Next, at step ST11, the combination search section 32 combines the results of output U1, U2, . . . , Up of the signal detection section 24a provided at step ST2 in the range of Umns to Up1s set at step ST10 and the results of output D1, D2, . . . , Dq of the signal detection section 24b provided at step ST4 in the range of Dmns to Dp1s set at step ST10, and makes a search for combination Cij (Ui, Dj) in which the relative distance R found according to expression (6) becomes the range of Rk shown in expression (5). If the combination is found, control goes to step ST7 at which the combination search section 25 outputs the relative distance R found at the search time to a display section 15 in FIG. 1 and outputs the combination Cij (Ui, Dj) to the speed measurement section 26.

The speed measurement section 26 uses expression (7) to find relative speed V of the target from the input combination Cij (Ui, Dj) and outputs the relative speed V to the display section 15. The display section 15 displays the input relative distance R and relative speed V as information using text or an image on a CRT, for example.

At step ST8, the signal processing control section 30 adds one to the counter variable k. At step ST9, the signal processing control section 30 compares the value of the counter variable k with n. If the value of the counter variable k is less than n, the signal processing control section 30 causes the frequency analysis section 23a to again execute step ST2; if the value of the counter variable k is greater than n, the signal processing control section 30 terminates the process.

Since the combination search range is thus set in the embodiment, the processing time required for making a search for a combination can be shortened for measuring the target.

The signal processing section 29 shown in FIG. 2 may have the components formed of their dedicated circuits or may be a computer with the signal processing control section 30 as a central processing unit and other components as software.

Second embodiment

Figure 4:
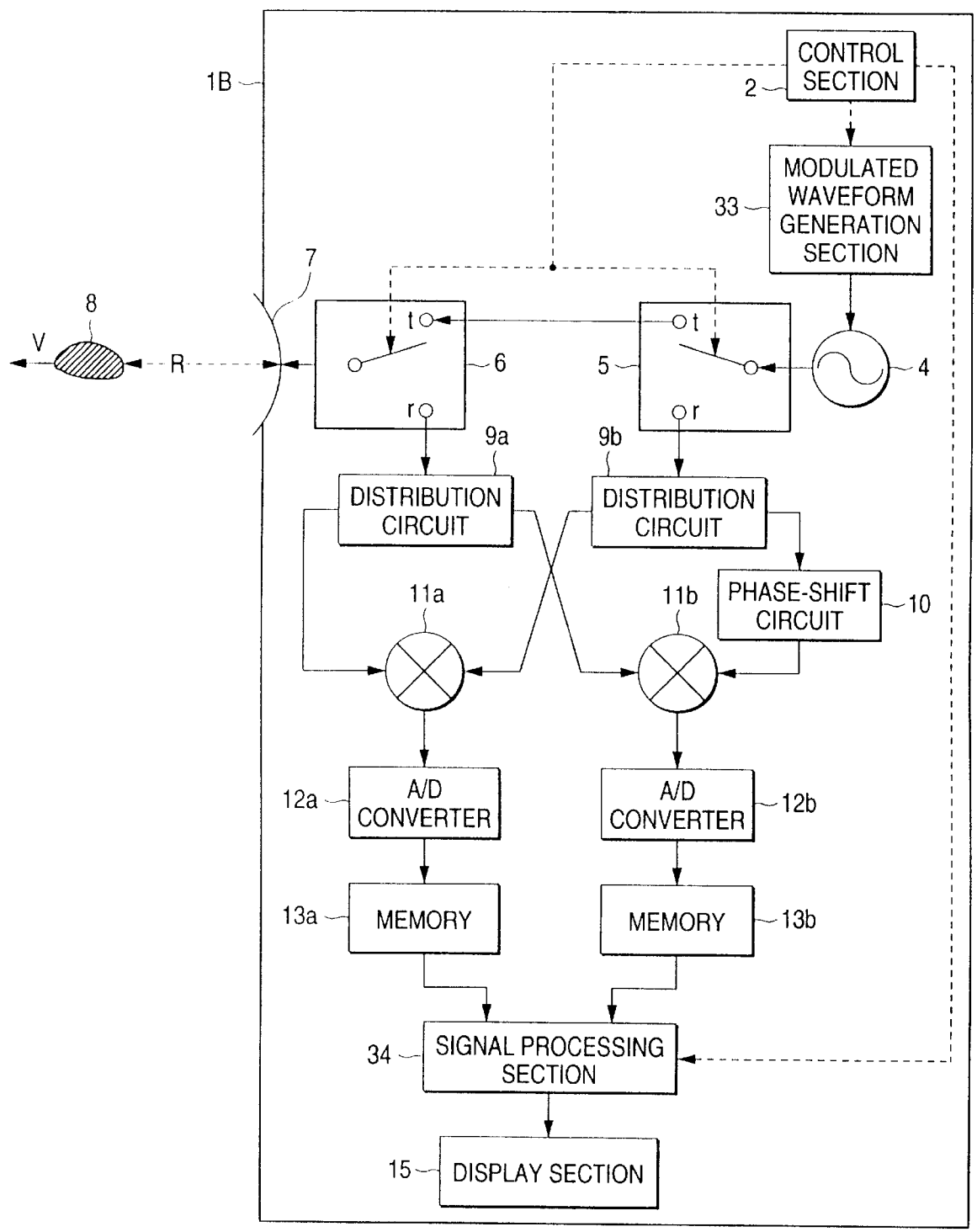
FIG. 4 is a diagram to show the configuration of a second embodiment of the invention.

FIG. 4 is a diagram to show the configuration of a second embodiment of the invention.

Parts identical with or similar to those previously described with reference to FIG. 1 are denoted by the same reference numerals in FIG. 4 and will not be discussed again in detail.

A radar apparatus 1B of the second embodiment has the same configuration as the radar apparatus 1A of the first embodiment except that it comprises a modulated waveform generation section 33 for generating modulated waveforms of up phase and non-modulation phase in place of the modulated waveform generation section 3 in FIG. 1 and a signal processing section 34 as signal processing means in place of the signal processing section 29. Components 2, 4 to 6, and 33 make up signal generation means and components 34 and 15 make up signal processing means.

Figure 5:
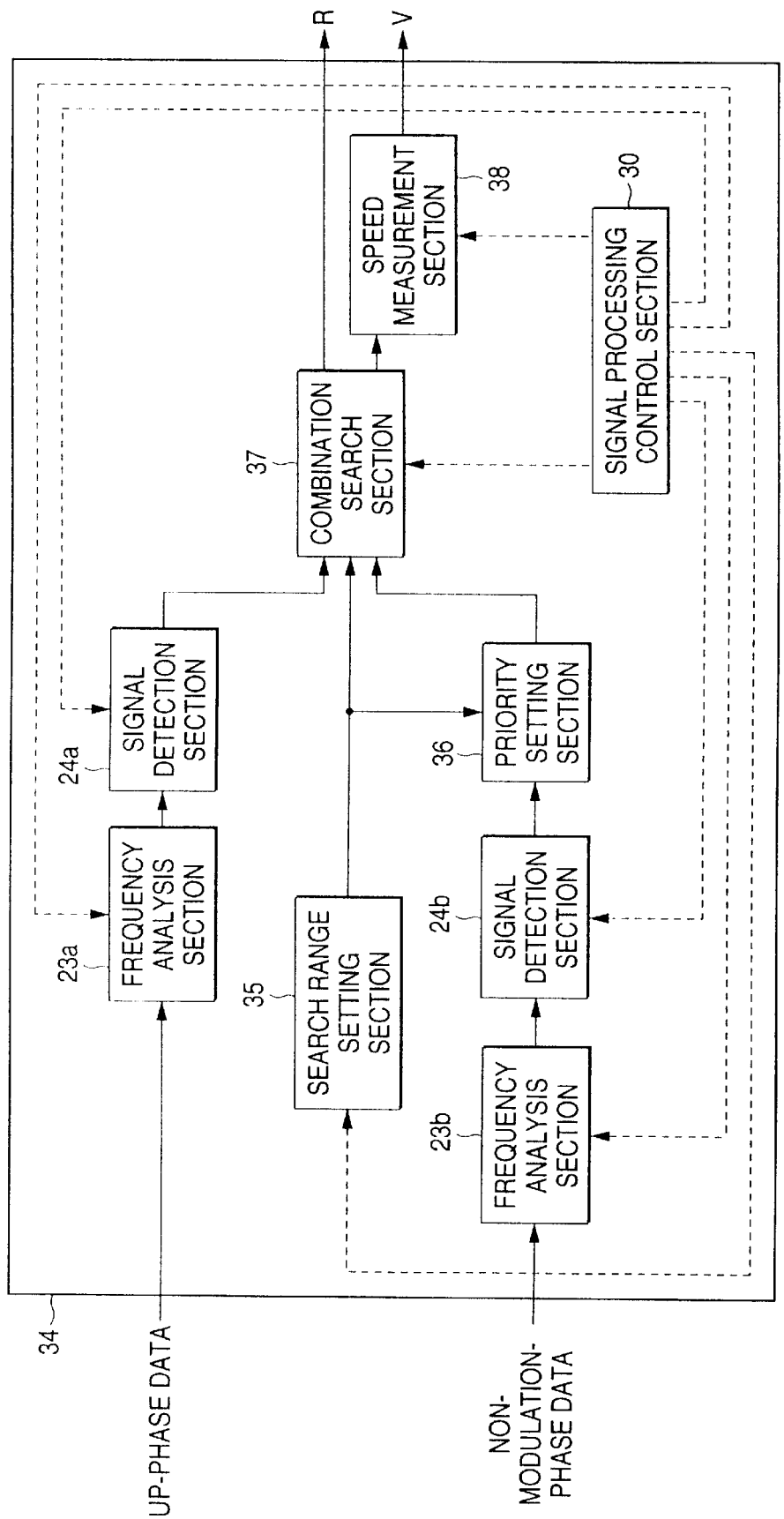
FIG. 5 is a block diagram to show a signal processing section in the second embodiment of the invention.

FIG. 5 is a block diagram to show a specific circuit configuration example of the signal processing section 34.

Parts identical with or similar to those previously described with reference to FIG. 2 are denoted by the same reference numerals in FIG. 5 and will not be discussed again in detail.

The signal processing section 34 comprises frequency analysis sections 23a and 23b, signal detection sections 24a and 24b, a search range setting section 35, a combination search section 37, a speed measurement section 38, a priority setting section 36 for prioritizing detection signals from the signal detection section 24b in the search range set by the search range setting section 35, and a signal processing control section 30 for controlling the sections.

The search range setting section 35 sets a combination search range under the control of the signal processing control section 30. The combination search section 37 makes a search for a desired combination in combinations of frequencies of spectrum detected by the signal detection section 24b and detection signals (frequencies of spectrum) sorted by the priority setting section 36 from the signal detection section 24b in the search range set by the search range setting section 35 under the control of the signal processing control section 30. Other components are equivalent to those previously described with reference to FIG. 2.

Figure 6:
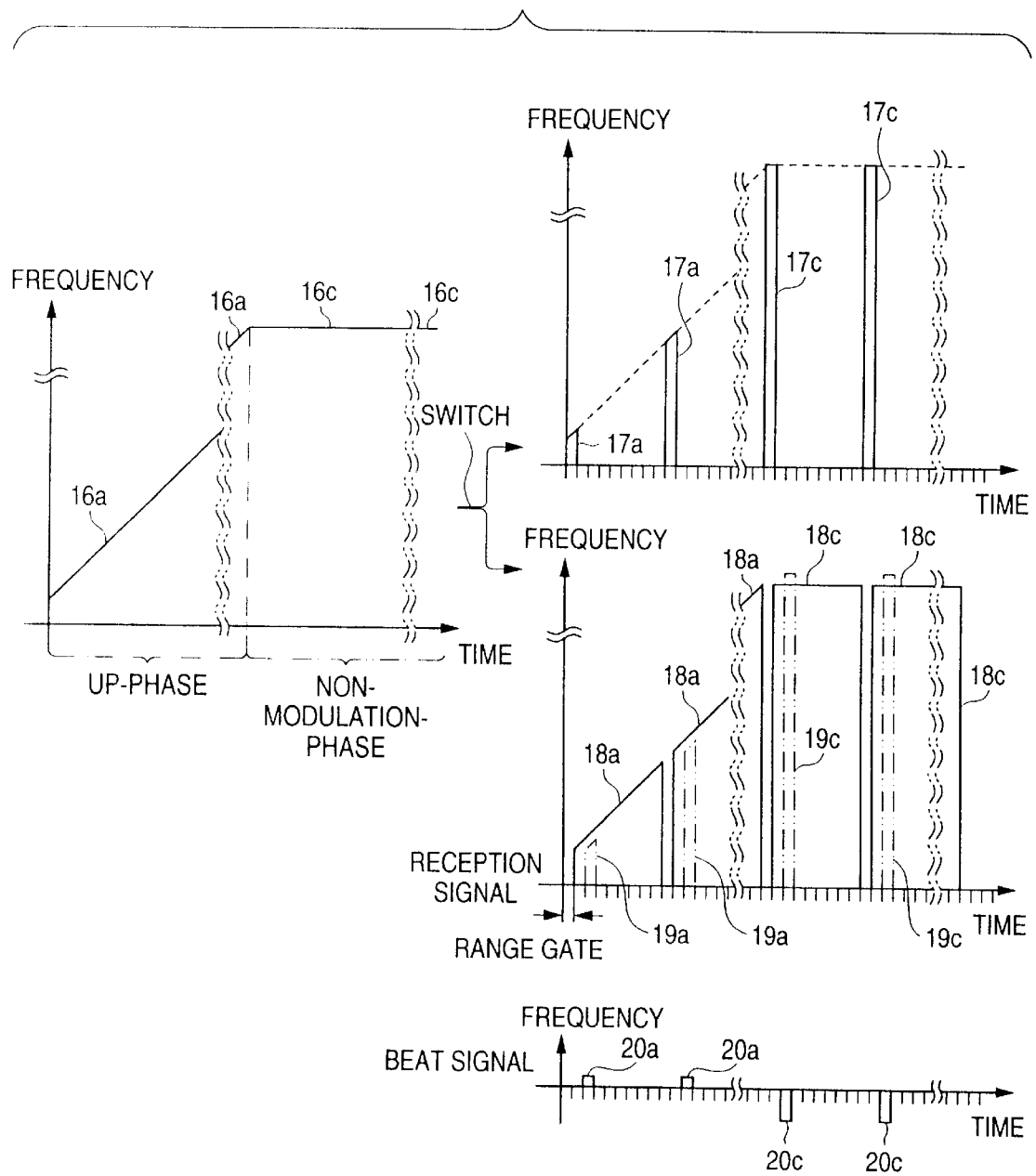
FIG. 6 is a chart to show frequencies of signals relative to time in the second embodiment of the invention.
Figure 16:
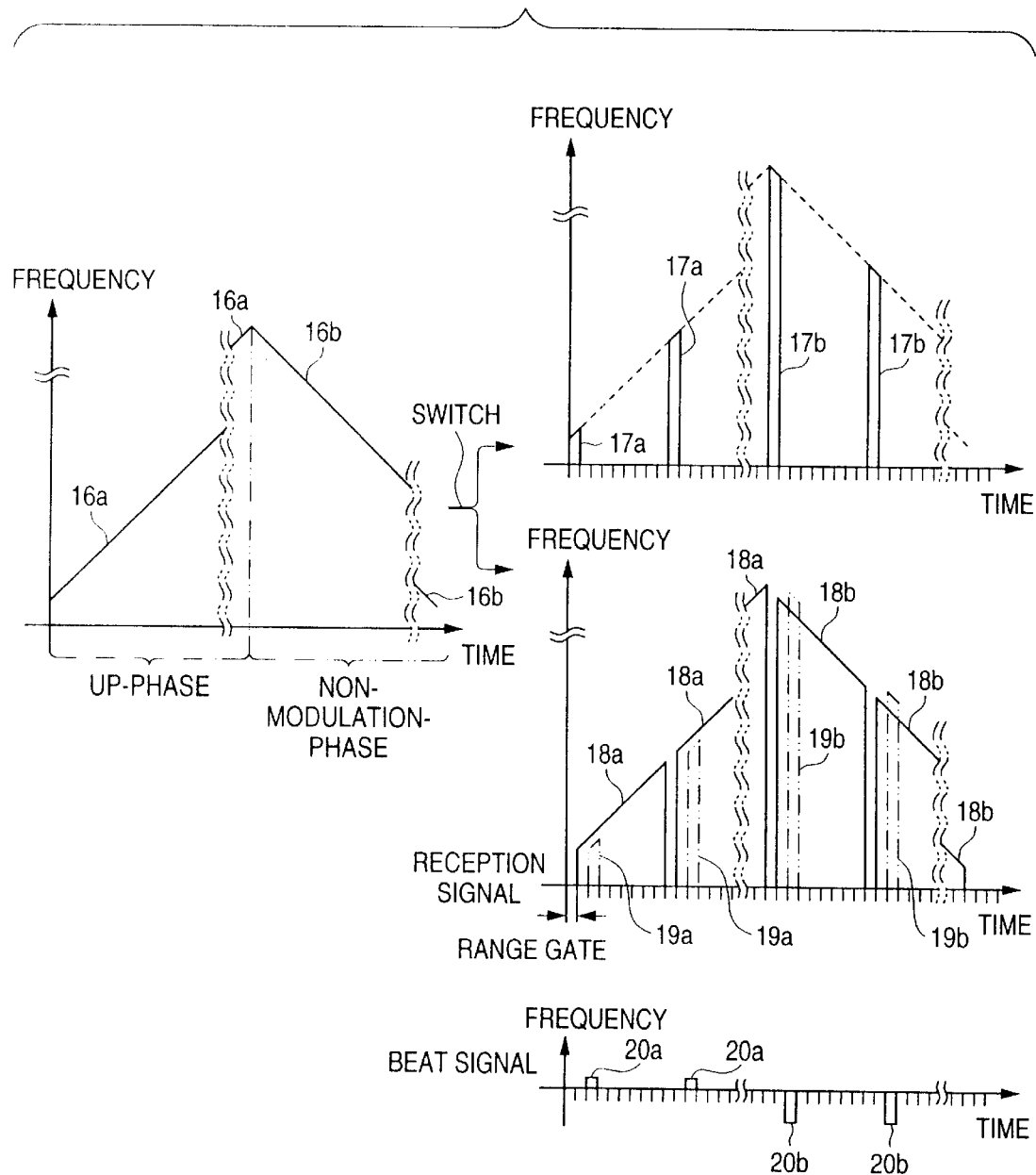
FIG. 16 is a chart to show frequencies of signals relative to time in the radar apparatus in the related art.
Figure 17:
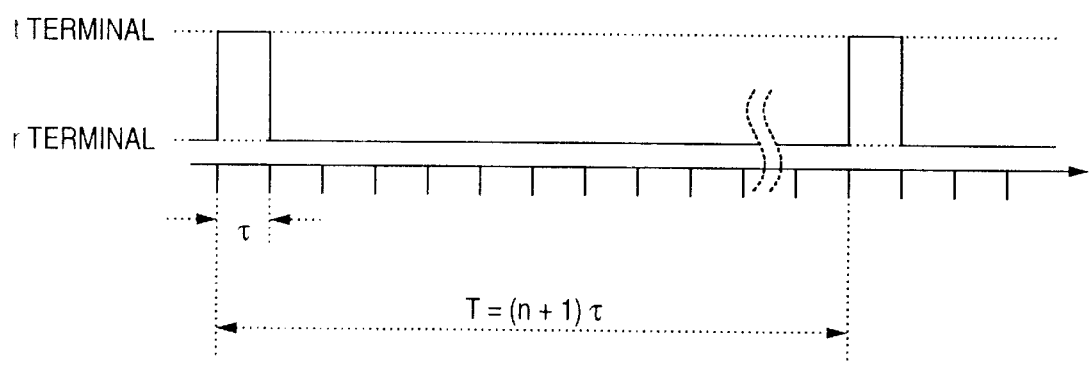
FIG. 17 is a chart to show connection terminals of switches relative to time in the radar apparatus in the related art.
Figure 18:
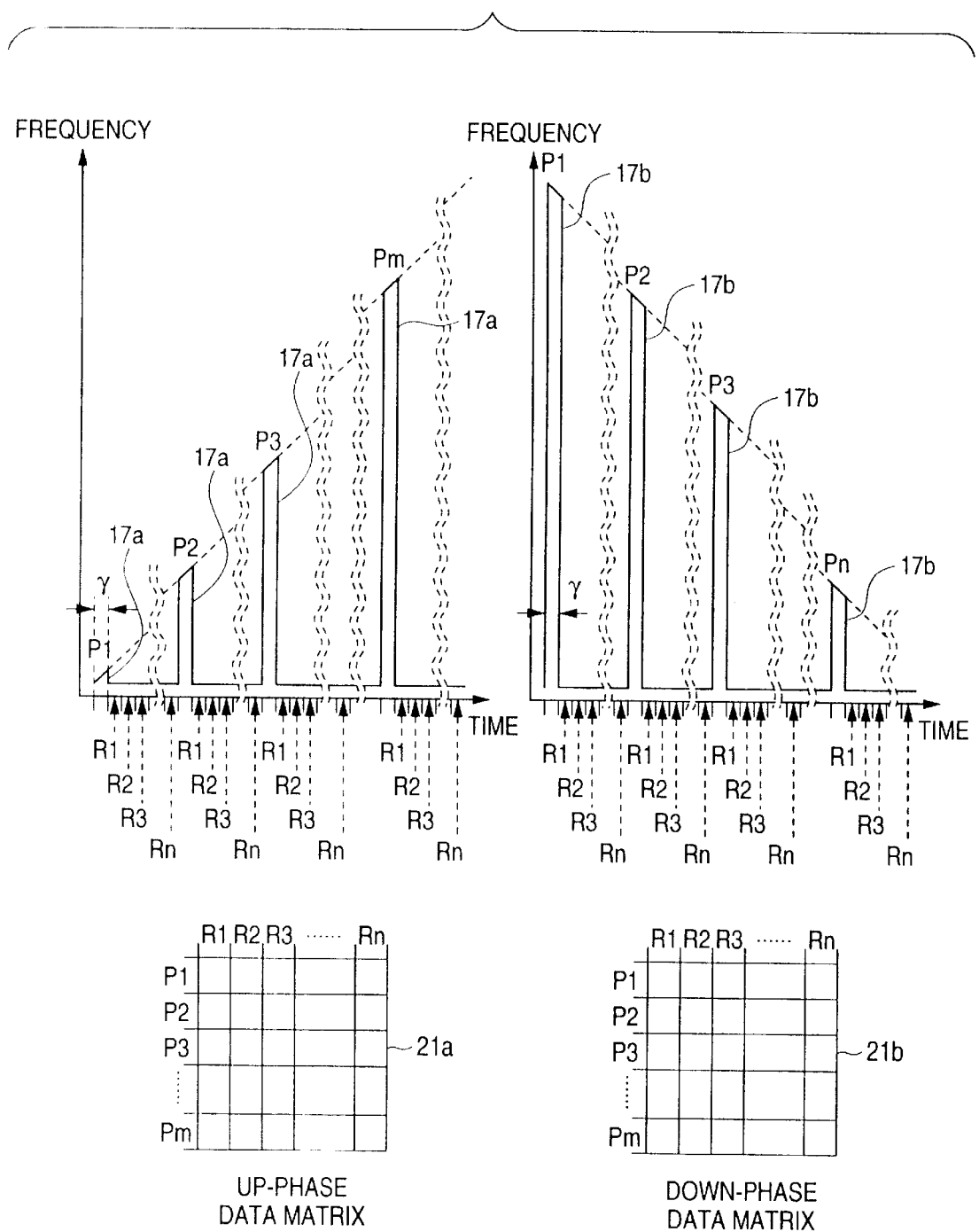
FIG. 18 is an illustration to show data matrixes in memory in the radar apparatus in the related art.

FIG. 6 shows the frequencies of the signals relative to the time in the FMICW method. Hereinafter, the modulation phase in which the frequency becomes higher with the passage of time will be called up phase as in FIG. 16 described above and the phase in which the frequency is constant regardless of the passage of time will be called non-modulation phase.

In FIG. 6, a VCO signal 16a of up phase and a VCO signal 16c of non-modulation phase are signals generated from a VCO 4 and a transmission signal 17a of up phase and a transmission signal 17c of non-modulation phase are signals emitted from the VCO 4 through an antenna 7 into the air for the time τ for which switches 5 and 6 connect to t terminals.

A local signal 18a of up phase and a local signal 18c of non-modulation phase are signals input from the VCO 4 to a distribution circuit 9b for the time T-τ for which the switches 5 and 6 connect to r terminals. A reception signal 19a of up phase and a reception signal 19c of non-modulation phase are signals received at the antenna 7 with a delay of a predetermined time after the transmission signals for the time T-τ for which the switches 5 and 6 connect to the r terminals, and input to a distribution circuit 9a. A beat signal 20a of up phase and a beat signal 20c of non-modulation phase are signals provided by mixing the local signals 18a and 18c and the reception signals 19a and 19c by mixers 11a and 11b.

Figure 7:
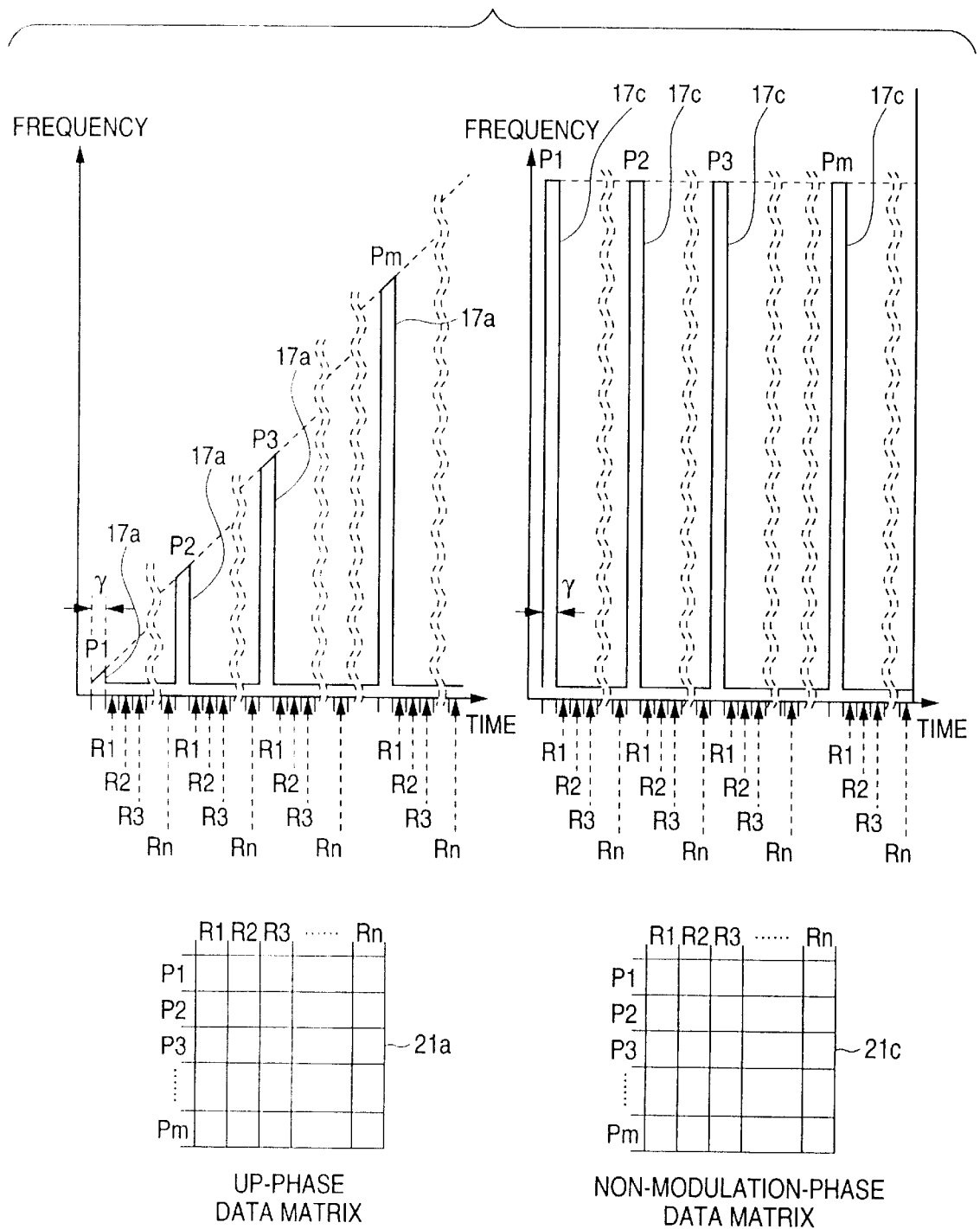
FIG. 7 is an illustration to show data matrixes in memory in the second embodiment of the invention.

FIG. 7 shows sample data of up phase and non-modulation phase in memories 13a and 13b in FIG. 4. When the transmission signal 17a and 17c in FIG. 6 are sampled at timings R1-Rn, data pieces P1-Pn are read accordingly and an up-phase data matrix 21a and a non-modulation-phase data matrix 21c each consisting of rows P1-Pn and columns R1-Rn in the lower portion of FIG. 7 are provided on the memories 13a and 13b.

Next, the general operation of the radar apparatus in FIG. 4 will be discussed.

For up phase, under the control of a control section 2, a radio wave from the VCO 4 via the switches 5 and 6 to the antenna 7 is transmitted from the antenna 7 and is reflected on a target 8 being at relative distance R and moving at relative speed V and the reflected wave passes through the antenna 7 and the switch 6, then is input via the distribution circuit 9 and a phase-shift circuit 10 to the mixer 11, which then generates a beat signal. The beat signal is sampled by A/D converter 12 and the sampling result is stored in the memory 13 as data, as described above in the first embodiment.

Next, as with the up phase, the modulated waveform generation section 33 performs transmission and reception for the non-modulation phase shown in FIG. 7, and data is stored in the memory 13. At this time, the data in each phase is stored in the memory 13 as shown in FIG. 7.

At the time at which sampling for data Pm terminates, the signal processing section 34 reads the data from the memory 13 and starts signal processing under the control of the control section 2.

Figure 8:
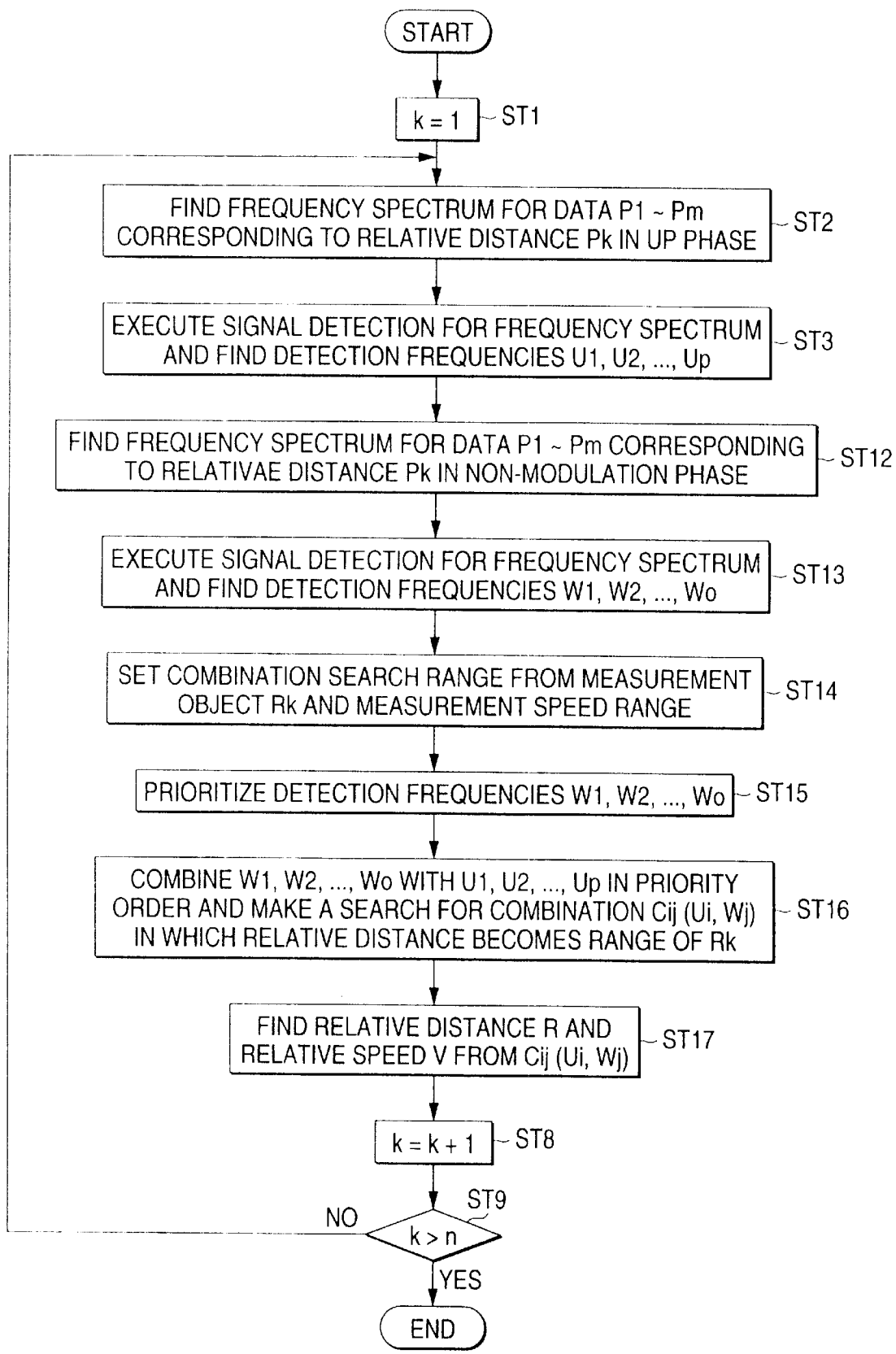
FIG. 8 is a flowchart to show a processing procedure for finding a relative distance and relative speed in the second embodiment of the invention.

Next, the detailed operation of the signal processing section 34 will be discussed with reference to FIG. 8.

First, at step ST1, the signal processing control section 30 sets its internal counter (variable) k=1. At steps ST2 and ST3, the frequency analysis section 23a and the signal detection section 24a operate for performing processing in the up phase under the control of the signal processing control section 30 as described above in the first embodiment.

At step ST12, under the control of the signal processing control section 30, the frequency analysis section 23b reads data P1-Pm in column Rk from the non-modulation-phase data matrix 21c in FIG. 7 and finds a frequency spectrum by performing FFT, etc., for example, for the data.

That is, at step ST12, a frequency spectrum is found for the data P1-Pm corresponding to Rk, of beat signal 20 represented by Scw(t) in expression (14) mentioned below in the non-modulation phase shown in FIG. 6. Then, the found frequency spectrum is output to the signal detection section 24b.

[Expression 6]

$$Wmns = -\frac{\lambda}{2} Vpls \tag{12}$$

$$Wpls = \frac{\lambda}{2} Vmns \tag{13}$$

At step ST13, under the control of the signal processing control section 30, the signal detection section 24b executes signal detection using CFAR detection, for example, for the input frequency spectrum, finds frequencies W1, W2, . . . , Wo of the spectrum detected as the target, and outputs the frequencies to the priority setting section 36.

At step ST14, the search range setting section 35 sets a combination search range in each phase according to expressions (8), (9), (12), and (13) mentioned below from the current measurement object, Rk, input from the signal processing control section 30 and preset measurement speed range −Vmns to Vpls, and outputs the combination search range to the priority setting section 36 and the combination search section 37.

That is, at step ST14, the combination search range is set in each phase from the current measurement object, Rk, and the preset measurement speed range −Vmns to Vpls.

In the up phase, the combination search range is from frequency Umns represented by expression (8) to frequency Up1s represented by expression (9); in the non-modulation phase, the combination search range is from frequency Wmns represented by expression (12) to frequency Wpls represented by expression (13).

[Expression 7]

$$Scw(t)=A_{cw}eIp(j2\pi W.t+\phi_{cw})=A_{cw}sin(2\pi W.t+\phi_{cw})+jA_{cw}cos(2\pi W.t+\phi_{cw}) \tag{14}$$

where $$W = -\frac{2}{\lambda} V \tag{15}$$

Acw: Amplitude term, φcw: Phase term

At step ST15, the priority setting section 36 sorts the input frequencies W1, W2, . . . , Wo in the range set at step ST14 according to preset priority, for example, in the ascending or descending order, and outputs the frequencies to the combination search section 37.

At step ST16, the combination search section 37 combines W1, W2, . . . , Wo in the sort order at step ST15 in the range set at step ST14 with U1, U2, . . . , Up found at step ST3, and makes a search for combination Cij (Ui, Wj) in which the relative distance R found according to the following expression (16) becomes the range of Rk shown in expression (5):

[Expression 8]

$$R = \left(\frac{cT}{2B}\right)(Ui - Wj) \tag{16}$$

If the combination is found, control goes to step ST17 at which the combination search section 37 outputs the relative distance R found at the search time to a display section 15 in FIG. 4 and outputs Wj of the combination Cij (Ui, Wj) to the speed measurement section 38. The speed measurement section 38 uses expression (17) mentioned below to find relative speed V from the input Wj and outputs the relative speed V to the display section 15. The display section 15 displays the input relative distance R and relative speed V as information using text or an image on a CRT, for example, as described above in the first embodiment.

At steps ST8 and ST9, the speed measurement section 38 and the signal processing control section 30 operate as those in the first embodiment described above.

[Expression 9]

$$V = -\frac{\lambda}{2} Wj \qquad (17)$$

Since the priority is thus set when a search is made for a combination in the embodiment, the relative distance and relative speed can be measured from a target having a high priority.

The signal processing section 34 shown in FIG. 5 may have the components formed of their dedicated circuits or may be a computer with the signal processing control section 30 as a central processing unit and other components as software.

Third embodiment

Figure 9:
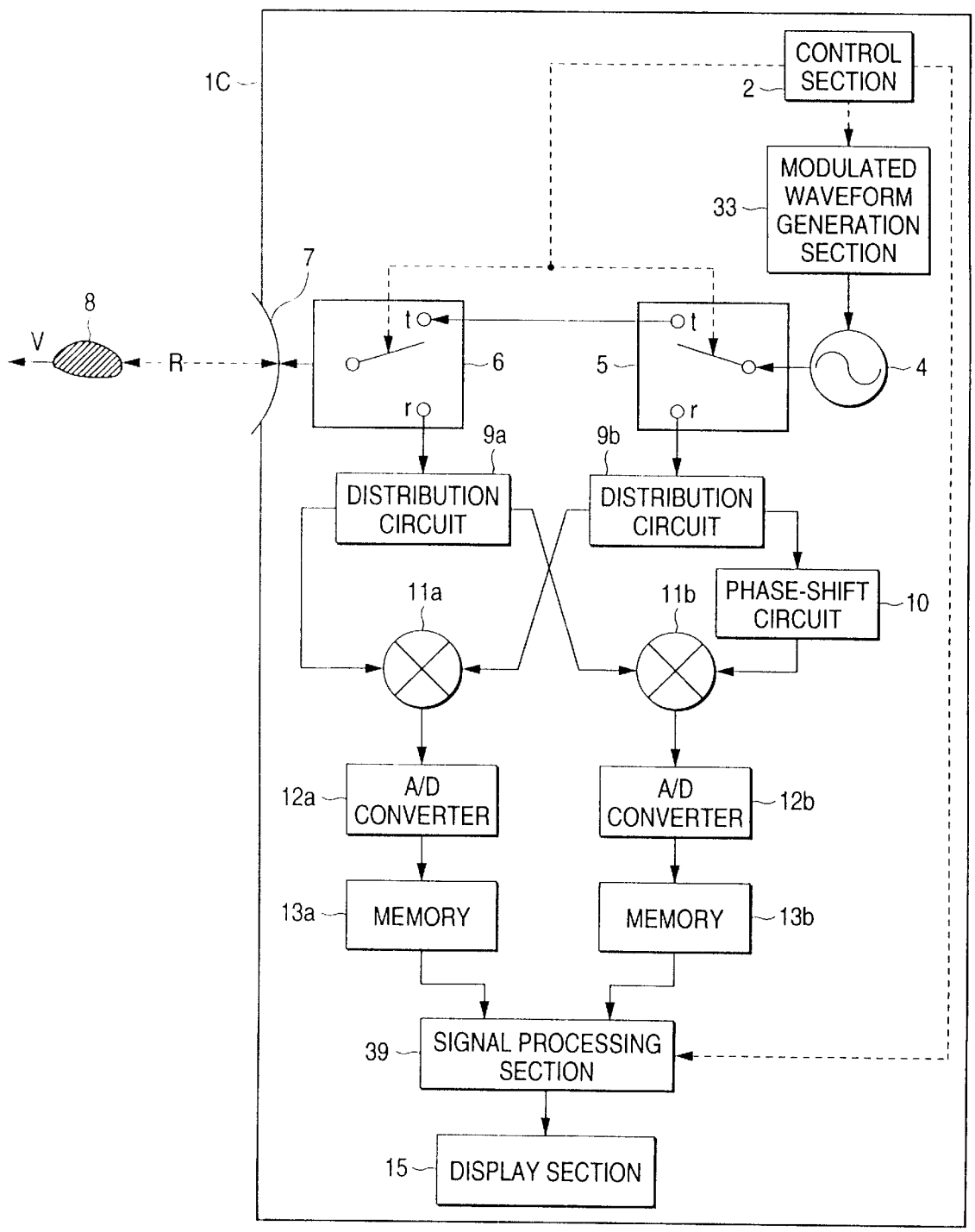
FIG. 9 is a diagram to show the configuration of a third embodiment of the invention.

FIG. 9 is a diagram to show the configuration of a third embodiment of the invention.

Parts identical with or similar to those previously described with reference to FIG. 1 are denoted by the same reference numerals in FIG. 9 and will not be discussed again in detail.

A radar apparatus 1C of the third embodiment has the same configuration as the radar apparatus 1A of the first embodiment except that it comprises a modulated waveform generation section 33 for generating modulated waveforms of up phase and non-modulation phase (identical with the modulated waveform generation section 33 previously described with reference to FIG. 4 in the second embodiment) in place of the modulated waveform generation section 3 in FIG. 1 and a signal processing section 39 as signal processing means in place of the signal processing section 29.

Figure 10:
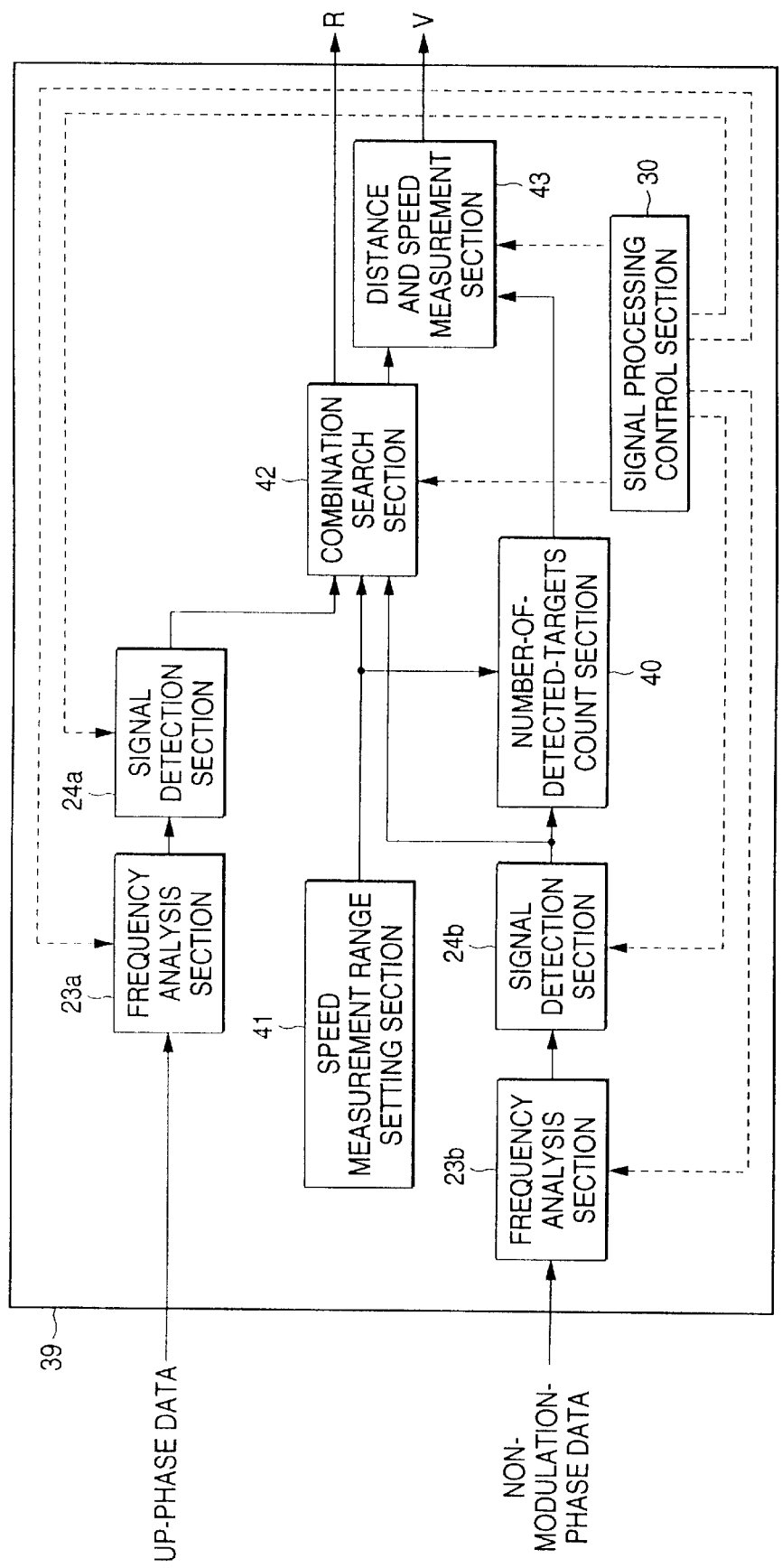
FIG. 10 is a block diagram to show a signal processing section in the third embodiment of the invention.

FIG. 10 is a block diagram to show a specific circuit configuration example of the signal processing section 39.

Parts identical with or similar to those previously described with reference to FIG. 2 are denoted by the same reference numerals in FIG. 10 and will not be discussed again in detail.

The signal processing section 39 comprises frequency analysis sections 23a and 23b, signal detection sections 24a and 24b, a speed measurement range setting section 41 for setting a speed measurement range in non-modulation phase, a number-of-detected-targets count section 40 for counting the number of frequencies of spectrum detected as target input from the signal detection section 24b in the range set by the speed measurement range setting section 41, a combination search section 42, a distance and speed measurement section 43, and a signal processing control section 30 for controlling the sections.

If the number of targets input from the number-of-detected-targets count section 40 is a predetermined value, the combination search section 42 outputs frequencies of spectrum input from the signal detection section 24a and frequencies of spectrum input from the signal detection section 24b; otherwise, the combination search section 42 outputs frequencies of spectrum in the range set by the speed measurement range setting section 41 under the control of the signal processing control section 30.

The distance and speed measurement section 43 measures a distance and speed based on output of the combination search section 42 and the number-of-detected-targets count section 40 under the control of the signal processing control section 30.

Other components are equivalent to those previously described with reference to FIG. 2.

Next, the general operation of the radar apparatus in FIG. 9 will be discussed.

For each of up phase and non-modulation phase, under the control of a control section 2, a radio wave from a VCO 4 via switches 5 and 6 to an antenna 7 is transmitted from the antenna 7 and is reflected on a target 8 being at relative distance R and moving at relative speed V and the reflected wave passes through the antenna 7 and the switch 6, then is input via distribution circuit 9 and a phase-shift circuit 10 to mixer 11, which then generates a beat signal. The beat signal is sampled by A/D converter 12 and the sampling result is stored in memory 13 as data, as in the second embodiment described above. At this time, the data is stored as shown in FIG. 7, as in the second embodiment described above.

At the time at which sampling for data Pm terminates, the signal processing section 39 reads the data from the memory 13 and starts signal processing under the control of the control section 2.

Figure 11:
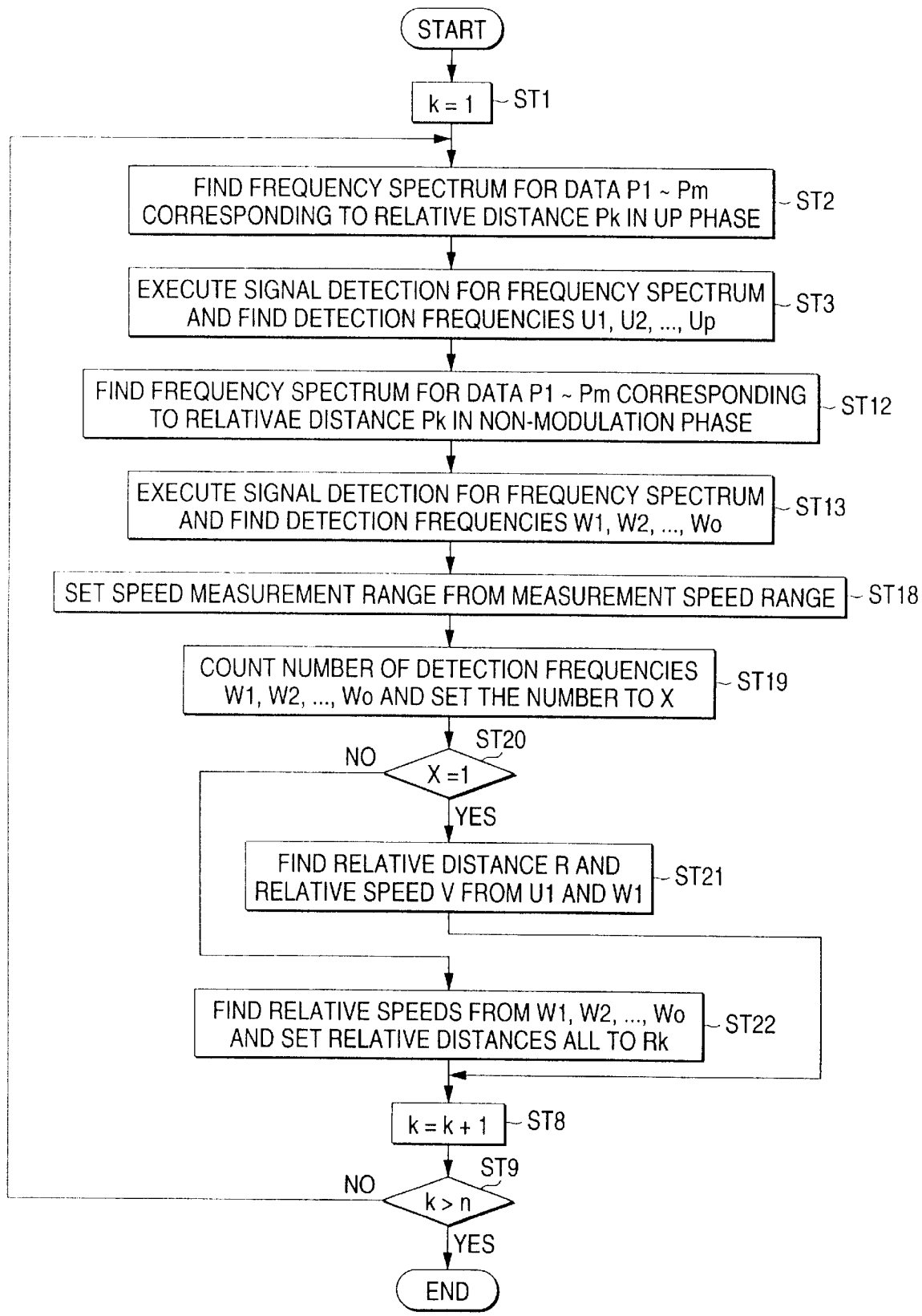
FIG. 11 is a flowchart to show a processing procedure for finding a relative distance and relative speed in the third embodiment of the invention.

Next, the detailed operation of the signal processing section 39 will be discussed with reference to FIG. 11.

First, at step ST1, the signal processing control section 30 sets its internal counter (variable) k=1. At steps ST2, ST3, ST12, and ST13, the frequency analysis sections 23a and 23b and the signal detection sections 24a and 24b operate under the control of the signal processing control section 30 as in the second embodiment described above.

At step ST18, the speed measurement range setting section 41 sets the speed measurement range in non-modulation phase from frequency Wmns represented by expression (12) mentioned above to frequency Wp1s represented by expression (13) mentioned above from preset measurement speed range −Vmns to Vp1s.

The speed measurement range setting section 41 outputs the speed measurement range set according to the expressions (12) and (13) to the number-of-detected-targets count section 40 and the combination search section 42.

Next, at step ST19, the number-of-detected-targets count section 40 counts the number X of frequencies W1, W2, . . . , Wo of spectrum detected as target input from the signal detection section 24b in the range set at step ST18 by the speed measurement range setting section 41 and outputs the number X to the combination search section 42.

At step ST20, the combination search section 42 determines whether or not the number of targets, X, input from the number-of-detected-targets count section 40 is 1. If the number of targets, X, is 1, control goes to step ST21 at which the combination search section 42 feeds frequency U1 of spectrum input from the signal detection section 24a and frequency W1 of spectrum input from the signal detection section 24b into the distance and speed measurement section 43, which then finds relative distance R and relative speed V from expressions (16) and (17) mentioned above and outputs the found relative distance R and relative speed V to a display section 15.

If the number of targets, X, is not 1, control goes to step ST22 at which the combination search section 42 outputs W1, W2, . . . , Wx in the range set at step ST18 by the speed measurement range setting section 41 to the distance and speed measurement section 43.

The distance and speed measurement section 43 sets the relative distance to Rk' represented by expression (18) mentioned below and finds speeds V1, V2, . . . , Vx from W1, W2, . . . , Wx according to the expression (17) mentioned above, then outputs the relative distance and relative speeds to the display section 15 in FIG. 9. The display section 15 displays the input relative distance R and relative speed V as information using text or an image on a CRT, for example.

At steps ST8 and ST9, the signal processing control section 30 operates as that in the second embodiment described above.

[Expression 10]

$$Rk' = \left(\frac{2k+1}{2}\right)c\tau \tag{18}$$

Thus, in the embodiment, if more than one target exists in Rk, only the number of targets and the relative speeds of the targets are found and the typical value for Rk is adopted all as the relative distances of the targets, so that the processing time required for making a search for a combination can be saved for measuring the targets.

The signal processing section 39 shown in FIG. 10 may have the components formed of their dedicated circuits or may be a computer with the signal processing control section 30 as a central processing unit and other components as software.

Fourth embodiment

Figure 12:
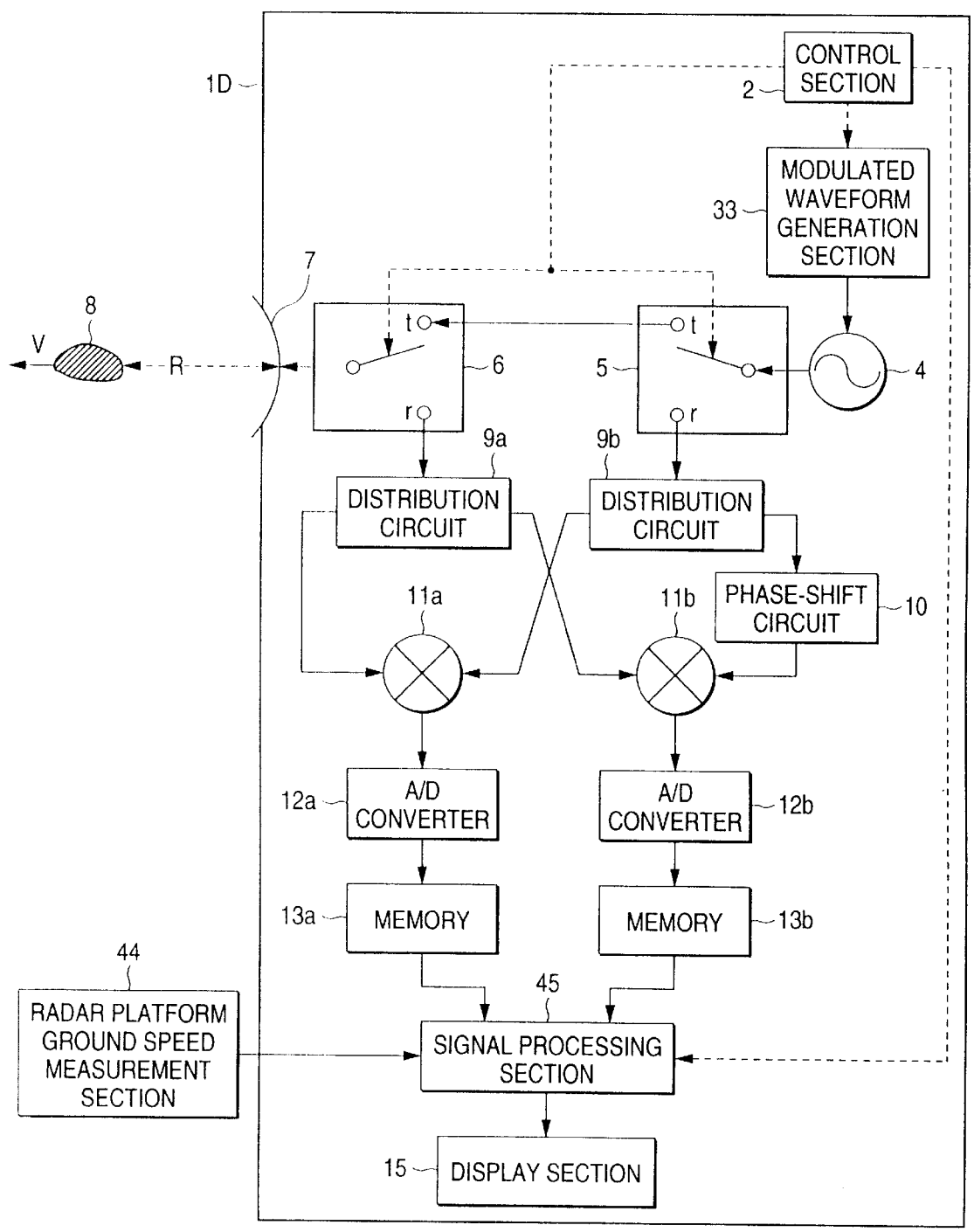
FIG. 12 is a diagram to show the configuration of a fourth embodiment of the invention.

FIG. 12 is a diagram to show the configuration of a fourth embodiment of the invention.

Parts identical with or similar to those previously described with reference to FIG. 4 are denoted by the same reference numerals in FIG. 12 and will not be discussed again in detail.

A radar apparatus 1D of the fourth embodiment has the same configuration as the radar apparatus 1B of the second embodiment except that it comprises a signal processing section 45 as signal processing means in place of the signal processing section 34.

Figure 13:
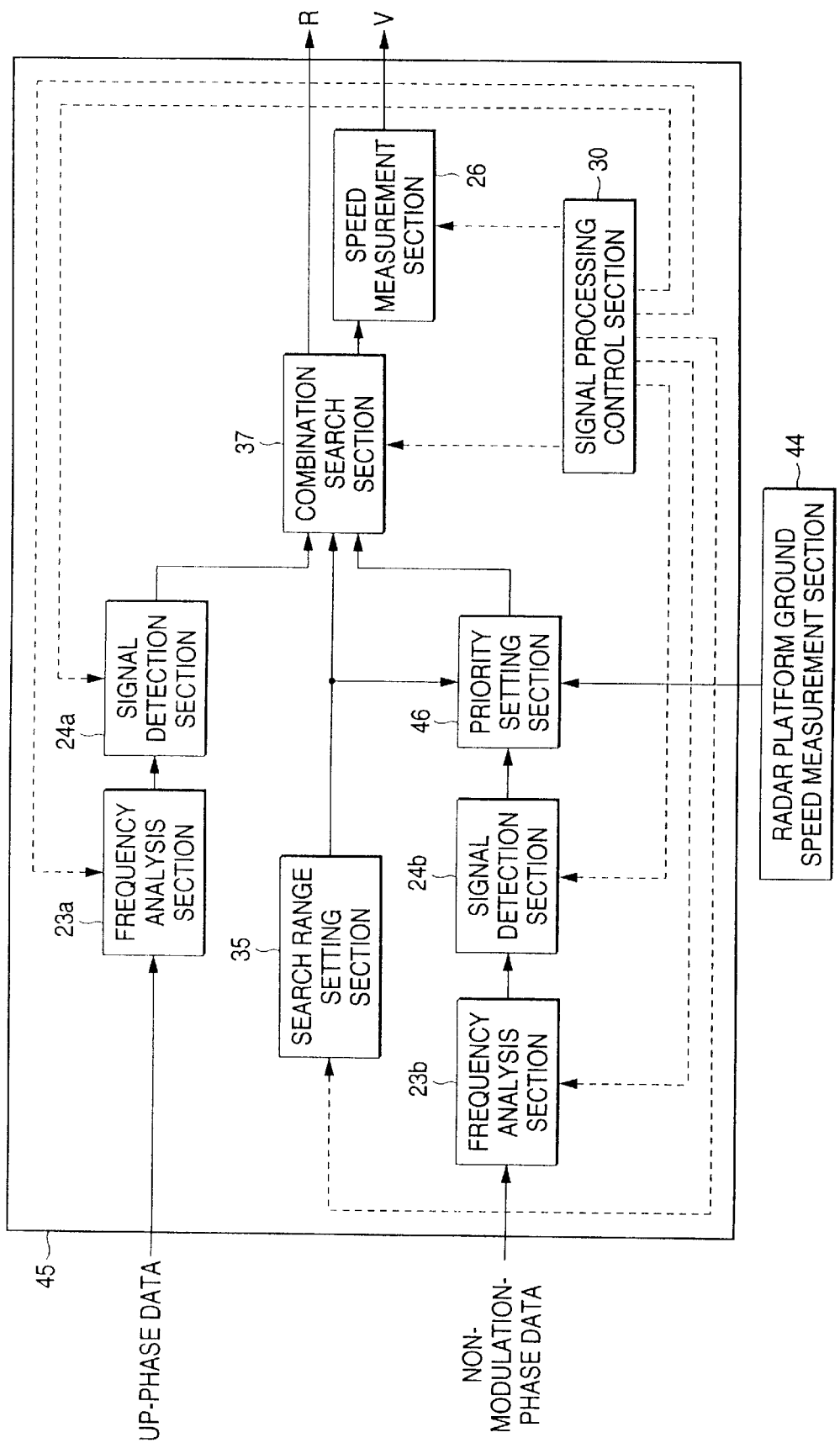
FIG. 13 is a block diagram to show a signal processing section in the fourth embodiment of the invention.

FIG. 13 is a block diagram to show a specific circuit configuration example of the signal processing section 45.

Parts identical with or similar to those previously described with reference to FIG. 2 and FIG. 5 are denoted by the same reference numerals in FIG. 13 and will not be discussed again in detail.

The signal processing section 45 comprises frequency analysis sections 23a and 23b, signal detection sections 24a and 24b, a search range setting section 35, a combination search section 37, a speed measurement section 26, a priority setting section 46 for prioritizing detection signals from the signal detection section 24b in the search range set by the search range setting section 35, and a signal processing control section 30 for controlling the sections.

The priority setting section 46 discards the signal of the signals which are input from the signal detection section 24b in the range set by the search range setting section 35, having a predetermined relationship with ground speed input from a radar platform ground speed measurement section 44, then sorts according to preset priority, for example, in the ascending or descending order, and outputs to the combination search section 37.

Other components are equivalent to those previously described with reference to FIG. 5.

Next, the general operation of the radar apparatus in FIG. 12 will be discussed.

For each of up phase and non-modulation phase, under the control of a control section 2, a radio wave from a VCO 4 via switches 5 and 6 to an antenna 7 is transmitted from the antenna 7 and is reflected on a target 8 being at relative distance R and moving at relative speed V and the reflected wave passes through the antenna 7 and the switch 6, then is input via distribution circuit 9 and a phase-shift circuit 10 to mixer 11, which then generates a beat signal. The beat signal is sampled by A/D converter 12 and the sampling result is stored in memory 13 as data, as in the second embodiment described above. At this time, the data is stored as shown in FIG. 7, as in the second embodiment described above.

At the time at which sampling for data Pm terminates, the signal processing section 45 reads the data from the memory 13 and starts signal processing under the control of the control section 2.

Figure 14:
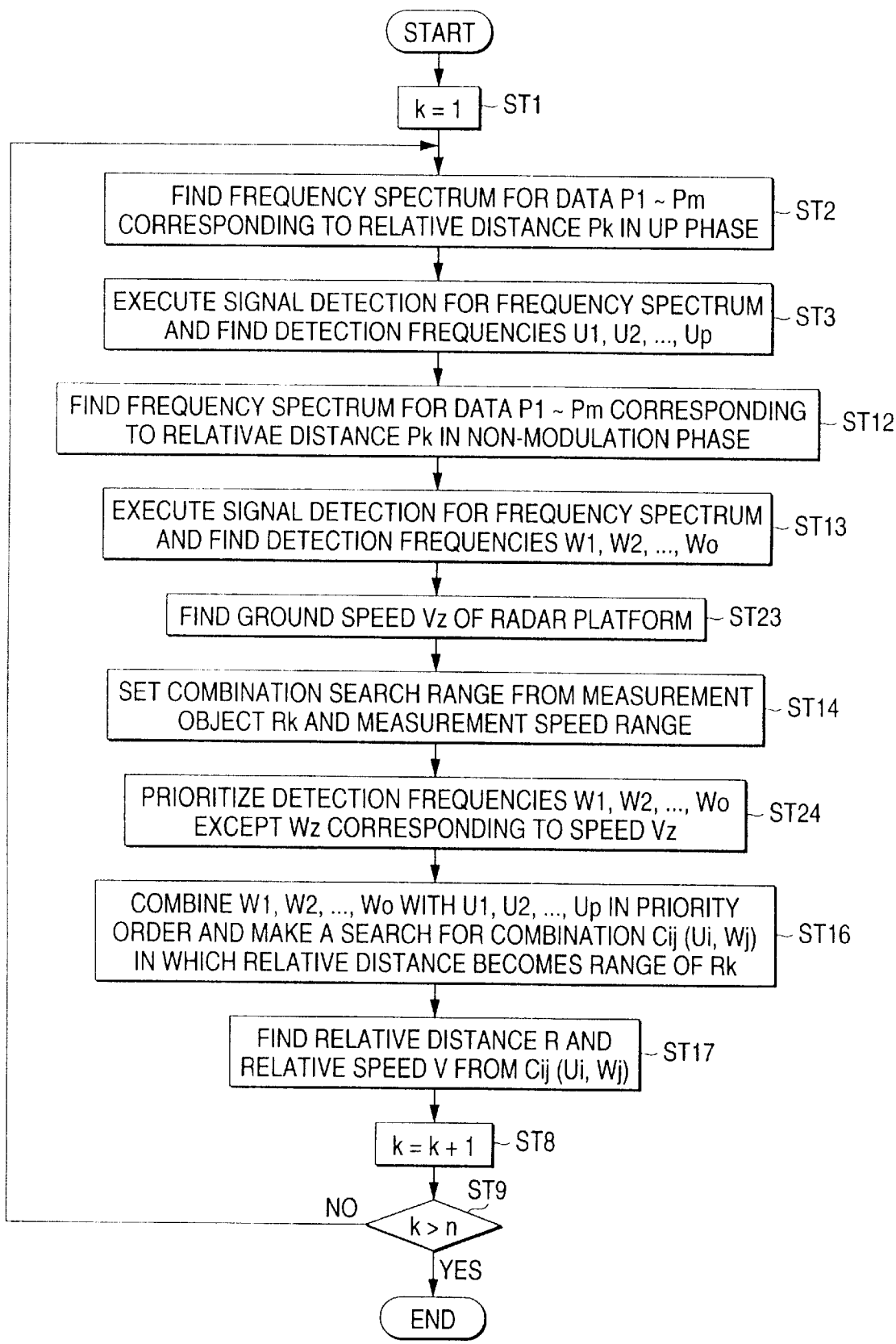
FIG. 14 is a flowchart to show a processing procedure for finding a relative distance and relative speed in the fourth embodiment of the invention.

Next, the detailed operation of the signal processing section 45 will be discussed with reference to FIG. 14.

First, at step ST1, the signal processing control section 30 sets its internal counter (variable) k=1. At steps ST2, ST3, ST12, and ST13, the frequency analysis sections 23a and 23b and the signal detection sections 24a and 24b operate under the control of the signal processing control section 30 as in the second embodiment described above.

At step ST23, for example, if the radar platform is an automobile, the radar platform ground speed measurement section 44 measures ground speed Vz of the automobile (radar platform) from the number of revolutions of a tire, etc., and outputs the ground speed Vz to the priority setting section 46.

At step ST14, the search range setting section 35 operates as that in the second embodiment described above.

Next, at step ST24, the priority setting section 46 discards the frequency of frequencies W1, W2, . . . , Wo of spectrum which are input at step ST23 from the signal detection section 24b in the range set at step ST14 by the search range setting section 35, having the relationship indicated by the following expression (19) with the ground speed Vz input from the radar platform ground speed measurement section 44, then sorts according to the preset priority, for example, in the ascending or descending order, and outputs to the combination search section 37:

[Expression 11]

$$\left|-Wj\frac{\lambda}{2} - Vz\right| < \varepsilon \tag{19}$$

At step ST15, the combination search section 37 operates as that in the second embodiment described above, at step ST16, the speed measurement section 26 operates as that in the second embodiment described above, and at steps ST8 and ST9, the signal processing control section 30 operates as that in the second embodiment described above. A display section 15 in FIG. 12 displays input relative distance R and relative speed V as information using text or an image on a CRT, for example.

Since the target approaching at the radar platform speed is thus discarded as a stationary object in the embodiment, the processing time required for making a search for a combination can be shortened for measuring the target.

The signal processing section 45 shown in FIG. 12 may have the components formed of their dedicated circuits or may be a computer with the signal processing control section 30 as a central processing unit and other components as software.

According to the first aspect of the invention, there is provided a radar data processing method of switching a continuous wave consisting of a modulation frequency rise period (up phase) and a modulation frequency fall period (down phase) into a transmission signal and a local signal in an interrupted manner and using a beat signal between the transmission signal and the local signal, the method comprising the steps of setting a range of beat frequencies in up phase used for making a search for a combination and a range of beat frequencies in down phase used for making a search for a combination from beat frequencies corresponding to a distance range to be measured and a preset measurement speed range, and making a search for a combination for the same target for the beat frequencies in the up phase and the beat frequencies in the down phase only in the range. That is, the range is set in a search made for a combination, so that the processing time required for making a search for a combination can be shortened.

According to the second aspect of the invention, there is provided a radar data processing method of switching a continuous wave consisting of up phase and non-modulation phase into a transmission signal and a local signal in an interrupted manner and using a beat signal between the transmission signal and the local signal, the method comprising a first step of setting a range of beat frequencies in up phase used for making a search for a combination and a range of beat frequencies in non-modulation phase used for making a search for a combination from beat frequencies corresponding to a distance range to be measured and a preset measurement speed range, a second step of assigning priorities provided based on a predetermined criterion to the beat frequencies in the non-modulation phase in the range, and a third step of making a search for a combination for the same target for the beat frequencies in the non-modulation phase assigned the priorities and the beat frequencies in the up phase only in the range. That is, the priority is set in a search made for a combination, so that the relative distance and relative speed can be measured from a target having a high priority.

According to the third aspect of the invention, in the second aspect of the invention, the first step is replaced with a fourth step of setting a range of beat frequencies to be measured in non-modulation phase from a preset measurement speed range, the method further comprises a fifth step of counting the number of the beat frequencies to be measured in the non-modulation phase only in the range, and the first and second steps are replaced with a sixth step of comparing the counted number of the beat frequencies with 1, a seventh step of finding a relative distance and relative speed from one beat frequency in the up phase and one beat frequency in the down phase if the number equals 1 as a result of the comparison, and an eighth step of finding the number of targets and relative speed of each target and adopting a typical value all as relative distances of the targets if the number does not equal 1 as a result of the comparison. Thus, the processing time required for making a search for a combination can be saved.

According to the fourth aspect of the invention, in the second asepect of the invention, a ninth step of measuring ground speed of a radar platform is added, the second step is replaced with a tenth step of discarding the result in the vicinity of the beat frequency corresponding to a target approaching at the ground speed for the beat frequencies in the non-modulation phase in the range and then assigning priority provided based on a predetermined criterion, and the target approaching at the radar platform speed is discarded as a stationary object, so that the processing time required for making a search for a combination can be shortened.

According to the fifth aspect of the invention, there is provided a radar apparatus comprising signal generation means for switching a continuous wave making a plurality of modulation forms into a transmission signal and a local signal in an interrupted manner and sending, beat signal formation means for forming a beat signal between a reception signal resulting from reflecting the transmission signal output by the signal generation means on an external target and the local signal and storing the beat signal, and signal processing means for measuring relative speed and relative distance of the target based on the beat signal from the beat signal formation means and a preset speed measurement range. Thus, the processing time required for making a search can be shortened for measuring the target rapidly in real time.

According to the sixth aspect of the invention, in the fifth aspect of the invention, the signal generation means comprises modulated waveform generation section for generating modulated waveform of up phase and down phase, and the signal processing means comprises a signal processing section having means for setting a range of beat frequencies in up phase used for making a search for a combination and a range of beat frequencies in down phase used for making a search for a combination from beat frequencies corresponding to a distance range to be measured and a preset measurement speed range and means for making a search for a combination for the same target for the beat frequencies in the up phase and the beat frequencies in the down phase only in the range. That is, the range is set in a search made for a combination, so that the processing time required for making a search for a combination can be shortened for measuring the target.

According to the seventh aspect of the invention, in the fifth aspect of the invention, the signal generation means comprises a modulated waveform generation section for generating modulated waveform of up phase and non-modulation phase, and the signal processing means comprises a signal processing section having means for setting a range of beat frequencies in up phase used for making a search for a combination and a range of beat frequencies in non-modulation phase used for making a search for a combination from beat frequencies corresponding to a distance range to be measured and a preset measurement speed range, means for assigning priorities provided based on a predetermined criterion to the beat frequencies in the non-modulation phase in the range, and means for making a search for a combination for the same target for the beat frequencies in the non-modulation phase assigned the priorities and the beat frequencies in the up phase only in the range. That is, the priority is set in a search made for a combination, so that the relative distance and relative speed can be measured from a target having a high priority.

According to the eighth aspect of the invention, the signal processing means comprises in place of the signal processing section in the seventh aspect of the invention, a signal processing section having means for setting a range of beat frequencies to be measured in non-modulation phase from a preset measurement speed range, means for counting the number of the beat frequencies to be measured in the non-modulation phase only in the range, and means for comparing the counted number of the beat frequencies with 1 and finding a relative distance and relative speed from one beat frequency in the up phase and one beat frequency in down phase if the number equals 1 as a result of the comparison, the means for finding the number of targets and relative speed of each target and adopting a typical value all as relative distances of the targets if the number does not equal 1 as a result of the comparison. That is, if more than one target exists within the relative distance, only the relative speeds of the targets are found and the typical value is adopted all as the relative distances of the targets, so that the processing time required for making a search for a combination can be saved for measuring the targets.

According to the ninth aspect of the invention, in the seventh aspect of the invention, a radar platform ground speed measurement section for measuring ground speed of a radar platform is further included, and the signal processing means comprises in place of the signal processing section, a signal processing section having means for discarding the result in the vicinity of the beat frequency corresponding to a target approaching at the ground speed for the beat frequencies in the non-modulation phase in the range and then assigning priority provided based on a predetermined criterion and the target approaching at the radar platform speed is discarded as a stationary object, so that the processing time required for making a search for a combination can be shortened for measuring the target.

What is claimed is:

1. A radar data processing method of switching a continuous wave consisting of a modulation frequency rise period (up phase) and a modulation frequency fall period (down phase) into a transmission signal and a local signal in an interrupted manner and using a beat signal between the local signal and a reception signal, said method comprising the steps of:

setting a range of beat frequencies in up phase used for making a search for a combination and a range of beat frequencies in down phase used for making a search for a combination from beat frequencies corresponding to a distance range to be measured and a preset measurement speed range; and making a search for a combination for the same target for the beat frequencies in the up phase and the beat frequencies in the down phase only in the range.

2. A radar data processing method of switching a continuous wave consisting of up phase and non-modulation phase into a transmission signal and a local signal in an interrupted manner and using a beat signal between the local signal and a reception signal, said method comprising:

a first step of setting a range of beat frequencies in up phase used for making a search for a combination and a range of beat frequencies in non-modulation phase used for making a search for a combination from beat frequencies corresponding to a distance range to be measured and a preset measurement speed range;

a second step of assigning priorities provided based on a predetermined criterion to the beat frequencies in the non-modulation phase in the range; and a third step of making a search for a combination for the same target for the beat frequencies in the non-modulation phase assigned the priorities and the beat frequencies in the up phase only in the range.

3. The radar data processing method as claimed in claim 2, wherein said first step is replaced with a fourth step of setting a range of beat frequencies to be measured in non-modulation phase from a preset measurement speed range, further comprising a fifth step of counting the number of the beat frequencies to be measured in the non-modulation phase only in the range, wherein said first and second steps are replaced with:

a sixth step of comparing the counted number of the beat frequencies with 1;

a seventh step of finding a relative distance and relative speed from one beat frequency in the up phase and one beat frequency in the down phase if the number equals 1 as a result of the comparison; and an eighth step of finding the number of targets and relative speed of each target and adopting a typical value all as relative distances of the targets if the number does not equal 1 as a result of the comparison.

4. The radar data processing method as claimed in claim 2 further comprising a ninth step of measuring ground speed of a radar platform, wherein said second step is replaced with a tenth step of discarding the result in the vicinity of the beat frequency corresponding to a target approaching at the ground speed for the beat frequencies in the non-modulation phase in the range and then assigning priority provided based on a predetermined criterion.

5. A radar apparatus comprising:

signal generation means for switching a continuous wave making a plurality of modulation forms into a transmission signal and a local signal in an interrupted manner and sending;

beat signal formation means for forming a beat signal between a reception signal resulting from reflecting the transmission signal output by said signal generation means on an external target and the local signal and storing the beat signal; and signal processing means for measuring relative speed and relative distance of the target based on the beat signal from said beat signal formation means and a preset speed measurement range.

6. The radar apparatus as claimed in claim 5 wherein said signal generation means comprises modulated waveform generation section for generating modulated waveform of up phase and down phase, and wherein said signal processing means comprises a signal processing section having means for setting a range of beat frequencies in up phase used for making a search for a combination and a range of beat frequencies in down phase used for making a search for a combination from beat frequencies corresponding to a distance range to be measured and a preset measurement speed range and means for making a search for a combination for the same target for the beat frequencies in the up phase and the beat frequencies in the down phase only in the range.

7. The radar apparatus as claimed in claim 5 wherein said signal generation means comprises a modulated waveform generation section for generating modulated waveform of up phase and non-modulation phase, and wherein said signal processing means comprises a signal processing section having means for setting a range of beat frequencies in up phase used for making a search for a combination and a range of beat frequencies in non-modulation phase used for making a search for a combination from beat frequencies corresponding to a distance range to be measured and a preset measurement speed range, means for assigning priorities provided based on a predetermined criterion to the beat frequencies in the non-modulation phase in the range, and means for making a search for a combination for the same target for the beat frequencies in the non-modulation phase assigned the priorities and the beat frequencies in the up phase only in the range.

8. The radar apparatus as claimed in claim 7 wherein said signal processing means comprises in place of the signal processing section:

a signal processing section having means for setting a range of beat frequencies to be measured in non-modulation phase from a preset measurement speed range, means for counting the number of the beat frequencies to be measured in the non-modulation phase only in the range, and means for comparing the counted number of the beat frequencies with 1 and finding a relative distance and relative speed from one beat frequency in the up phase and one beat frequency in down phase if the number equals 1 as a result of the comparison, said means for finding the number of targets and relative speed of each target and adopting a typical value all as relative distances of the targets if the number does not equal 1 as a result of the comparison.

9. The radar apparatus as claimed in claim 7 further including a radar platform ground speed measurement section for measuring ground speed of a radar platform, wherein said signal processing means comprises in place of the signal processing section:

a signal processing section having means for discarding the result in the vicinity of the beat frequency corresponding to a target approaching at the ground speed for the beat frequencies in the non-modulation phase in the range and then assigning priority provided based on a predetermined criterion.

* * * * *